(12) United States Patent
Boyce et al.

(10) Patent No.: US 11,991,376 B2
(45) Date of Patent: May 21, 2024

(54) SWITCHABLE SCALABLE AND MULTIPLE DESCRIPTION IMMERSIVE VIDEO CODEC

(71) Applicant: Intel Corporation, Santa Clara, CA (US)

(72) Inventors: Jill Boyce, Portland, OR (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 17/226,510

(22) Filed: Apr. 9, 2021

(65) Prior Publication Data

US 2021/0258590 A1 Aug. 19, 2021

Related U.S. Application Data

(60) Provisional application No. 63/007,859, filed on Apr. 9, 2020.

(51) Int. Cl.
*H04N 19/39* (2014.01)
*H04N 19/172* (2014.01)
*H04N 19/182* (2014.01)

(52) U.S. Cl.
CPC .......... *H04N 19/39* (2014.11); *H04N 19/172* (2014.11); *H04N 19/182* (2014.11)

(58) Field of Classification Search
CPC ..... H04N 19/39; H04N 19/172; H04N 19/182
See application file for complete search history.

(56) References Cited

U.S. PATENT DOCUMENTS

| | | | |
|---|---|---|---|
| 8,842,729 B2* | 9/2014 | Su | H04N 19/597 375/240.12 |
| 9,094,615 B2* | 7/2015 | Aman | G06T 19/006 |
| 2013/0136176 A1* | 5/2013 | Chen | H04N 13/10 375/240.12 |
| 2017/0339416 A1* | 11/2017 | Hendry | H04N 19/107 |
| 2017/0339440 A1* | 11/2017 | Galpin | H04N 21/21805 |
| 2018/0103199 A1* | 4/2018 | Hendry | H04N 21/440227 |
| 2018/0160123 A1* | 6/2018 | Van Der Auwera | H04N 19/167 |
| 2018/0176468 A1* | 6/2018 | Wang | G09G 5/14 |
| 2019/0068949 A1* | 2/2019 | Wang | H04N 13/139 |

FOREIGN PATENT DOCUMENTS

| | | | |
|---|---|---|---|
| CA | 2924651 | * | 4/2008 |
| WO | WO 2016024892 | * | 8/2014 |
| WO | WO-2016024892 | * | 8/2014 |

(Continued)

OTHER PUBLICATIONS

"Corresponding to" meaning, google search (Year: 2023).*

(Continued)

*Primary Examiner* — Zaihan Jiang
(74) *Attorney, Agent, or Firm* — Essential Patents Group, LLP

(57) ABSTRACT

Techniques related to immersive video coding are discussed. Such techniques include encoding an immersive video bitstream by applying scalable video coding to some portions of the immersive video and multiple description coding to other portions of the immersive video and decoding and/or rendering the immersive video bitstream using selective scalable video coding and multiple description coding responsive to indicators in the bitstream.

20 Claims, 18 Drawing Sheets

(56) References Cited

FOREIGN PATENT DOCUMENTS

| WO | WO 2018118972 | * 12/2017 |
| WO | WO-2018118972 | * 12/2017 |

OTHER PUBLICATIONS

Boyce, J. et al., "Working Draft 4 of Immersive Video", ISO/IEC JTC1/SC29/WG11 MPEG/N19001, Jan. 2020, Brussels, Belgium.
Salahieh, B. et al., "Test Model 4 Immersive Video", ISO/IEC JTC1/SC29/WG11 MPEG/N19002, Jan. 2020, Brussels, Belgium.

* cited by examiner

SWITCHABLE SCALABLE AND MULTIPLE DESCRIPTION IMMERSIVE VIDEO CODEC

CLAIM FOR PRIORITY

This application claims priority to U.S. Provisional Patent Application Ser. No. 63/007,859, filed on Apr. 9, 2020, and titled "SWITCHABLE SCALABLE AND MULTIPLE DESCRIPTION IMMERSIVE VIDEO CODEC", which is incorporated by reference in its entirety for all purposes.

BACKGROUND

In compression/decompression (codec) systems, compression efficiency and video quality are important performance criteria. For example, visual quality is an important aspect of the user experience in many video applications and compression efficiency impacts the amount of memory storage needed to store video files and/or the amount of bandwidth needed to transmit and/or stream video content. A video encoder compresses video information so that more information can be sent over a given bandwidth or stored in a given memory space or the like. The compressed signal or data is then decoded by a decoder that decodes or decompresses the signal or data for display to a user. In most implementations, higher visual quality with greater compression is desirable.

Current scalable image/video codecs have a base layer and one or more enhancement layers. Each enhancement layer may be at the same or a higher resolution than the base layer. When the resolutions are the same, it may be referred to as SNR (signal to noise ratio) scalability or quality scalability. Scalable coding may be used for error resiliency and/or to adapt to available network bandwidth. If the enhancement layers are lost during transmission, the base layer value can be used alone. However, if the base layer is lost, the enhancement layers are not sufficient by themselves for output or viewing.

Current multiple description image or video encoders separate the input picture into two or more descriptions. Assuming two descriptions at the encoder for simplicity, each of the two representations is encoded independently of the other description. If either of the two descriptions is lost in transmission, the other received description can be used for output or viewing. When both descriptions are available, a better quality image/video can be output from the decoder by combining the two descriptions. An example of multiple description coding is in immersive coding for multiple views of a linear camera array. The encoder can split the views into two groups where each includes every other camera such that the odd cameras are in the first group producing the first description while the even ones in the second group producing the second description. Each description is sufficient to reconstruct the whole content, however adding them both can increase the reconstruction quality.

When there are no transmission losses, both scalable coding and multiple description coding are less efficient than single layer coding (e.g., they require a higher bitrate for a similar video quality). Multiple description coding is generally less efficient than scalable coding. In scalable coding, the residual values coded in the enhancement layer are typically small and can be efficiently coded. Combining the scalable codec's base and enhancement layers improves image quality over the base layer alone. In multiple description coding, the multiple descriptions have similar characteristics to each other, and gets no coding efficiency benefit from the first description, since they are coded independently.

Currently, MPEG is developing two standards for coding immersive/volumetric video, which include a number of similar functional blocks. The MPEG Immersive Video (MIV) draft standard codes texture and depth (or geometry) video for multiple source views, each at a particular position and orientation, using existing video codecs. The V-PCC draft standard encodes a point cloud sequence by projecting the point cloud onto planar surfaces, and coding the texture and depth planar projections using existing video codec standards, such as AVC or HEVC. Such standards seek to establish and improve compression efficiency and reconstruction quality in the context of immersive video and point cloud coding.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
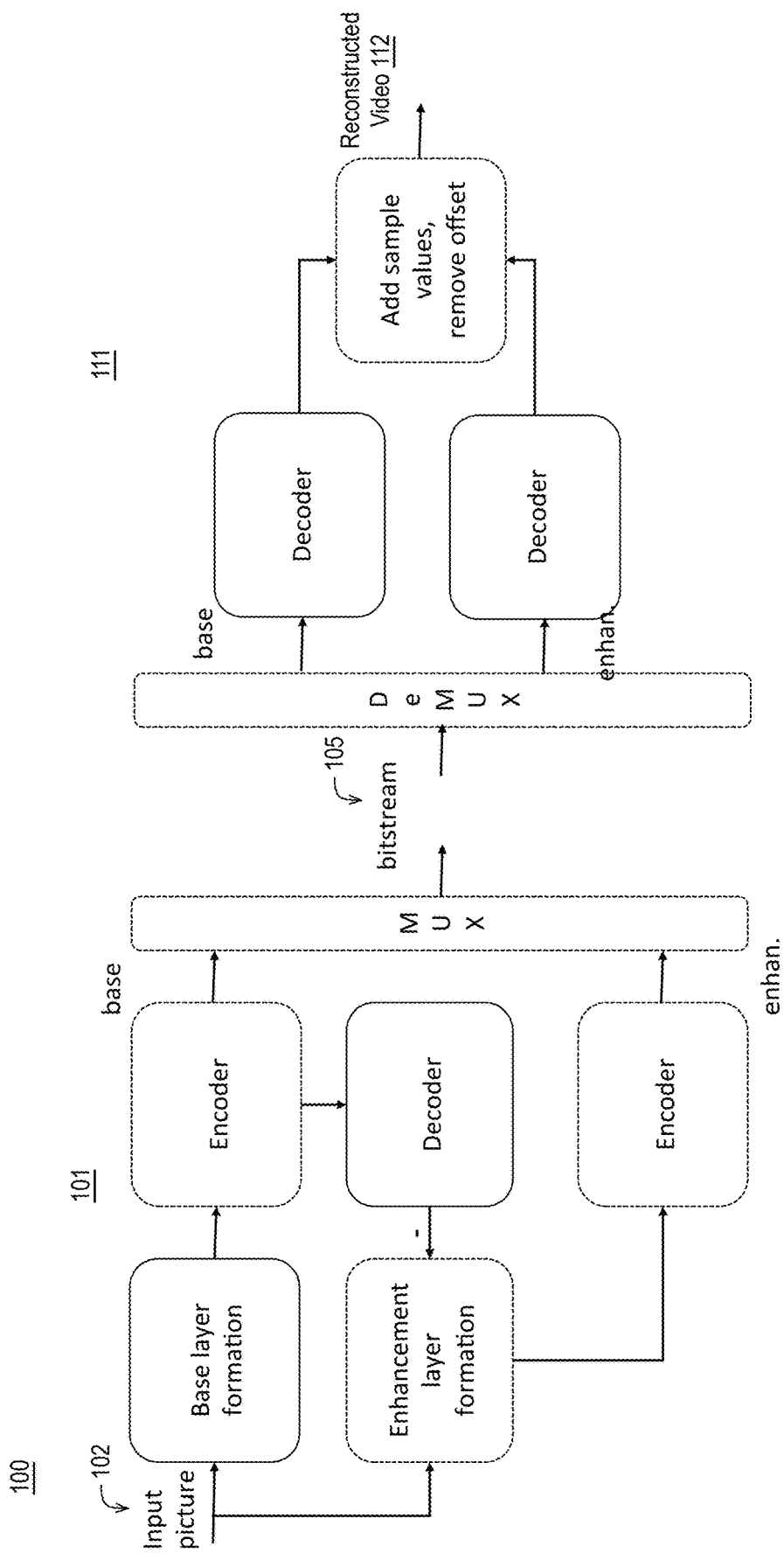
FIG. 1 is a block diagram of an example scalable coding context including an example scalable encoder system and an example scalable decoder system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, computing platforms, and articles are described herein related to video coding and, in particular, to switchable scalable and multiple description coding for immersive video.

The techniques discussed herein improve coding efficiency and video quality of an immersive video codec (inclusive of a volumetric codec) by providing different variants of scalable coding and multiple descriptions in their framework along with the signaling that can be used to switch between scalable coding and multiple description coding for patches or atlases of patches or views. Herein, the terms atlases, patches, and views are used in accordance with their use in the immersive video and point cloud coding standards. For example, a patch may indicate region of texture, depth (or geometry), or other pixel-wise data, an atlas may indicates a combination of such patches and, optionally, other video data, and a view may indicate a view of a scene represented by the immersive video.

FIG. 1 is a block diagram of an example scalable coding context 100 including an example scalable encoder system 101 and an example scalable decoder system 111, arranged in accordance with at least some implementations of the present disclosure. At scalable encoder system 101, input video 102 including input pictures is received.

Such input video 102, and any video discussed herein, may include any number of views of any suitable video frames, projected video data, video pictures, sequence of video frames, group of pictures, groups of pictures, video data, depth frames, depth pictures, texture atlases, geometry or depth atlases, texture patches, depth patches, attribute (e.g., texture, normal vectors, reflectance, etc.) pictures, frames, patches, atlases, or any frame data referenced in the immersive video and point cloud coding standards, or the like in any suitable resolution. For example, the video may be video graphics array (VGA), high definition (HD), Full-HD (e.g., 1080p), 4K resolution video, 8K resolution video, or the like. Herein, the terms texture, attribute, depth, and geometry are used in accordance with their use in the immersive video and point cloud coding standards At scalable encoder system 101, a base layer and one or more enhancement layers are formed from input video 102 or pictures thereof (e.g., a frame of a multi-view video content, patches from such views, atlases composed of patches from multiple views, etc.) via the base layer formation module and the enhancement layer formation module, with the base layer at a lower quality and/or resolution. Scalable encoder system 101 determines portions of the input video to code using scalable coding. As used herein, the term portion of video indicates any suitable part of video content at any level inclusive of clips, sequences, frames or pictures, patches, blocks, and so on of any component of such video inclusive of texture, attribute, depth geometry, and so on. Notably, the portions of video coded using scalable coding are indicated by an indicator or flag in output bitstream. The base layer picture is encoded via the base layer encoder of encoder system 101, and locally decoded via the decoder of scalable encoder system 101. The decoded base layer picture is then subtracted from the input picture to form an enhancement layer residual, and the residual is coded via the enhancement layer encoder of scalable encoder system 101.

The residual can have negative or positive or zero sample values. In some embodiments, the residual is clipped and an offset value is applied such that only positive values are used. For example, with 8-bit data, after subtracting the base layer from the enhancement layer, the residual values may range from −256 to 256. Those values can be clipped to [−128, 127] and an offset value 128 added, such that the sample values given to the core video encoder are in the range [0, 255]. The process is repeated for other enhancement layers, if applicable, which may or may not factor in the residuals of previously processed enhancement layers but with different formation process such that the residual produced at each enhancement layer is unique. As shown, a multiplexer of scalable encoder system 101 combines the base layer bitstream and one or more enhancement layer bitstreams into a resultant bitstream 105, which is transmitted to scalable decoder system 111 or memory for eventual decode by scalable decoder system 111.

At scalable decoder system 111, the bitstream is received and demultiplexed, via a demultiplexer, into a base layer bitstream and one or more enhancement layer bitstreams. The base layer bitstream and the enhancement layer bitstream(s) are decoded, via a base layer decoder and enhancement layer decoder(s), respectively, and the decoded sample values of the base layer and enhancement layer(s) are added together, and the offset subtracted, to form the output sample value. Thereby, a reconstruction or reconstructed video 112 of the input provided at scalable encoder system 101 is generated at scalable decoder system 111. Notably, scalable decoder system 111 can generate output video with only the base layer or with the base layer and one or more enhancement layers, but not without the base layer. Such reconstructed video 112 may be presented to a user for example. Portions of reconstructed video 112 flagged or indicated as being coded using scalable video coding are reconstructed by combining (i.e., adding) pixel samples from the base layer and pixel samples from the enhancement layer such that the pixel samples from the enhancement layer are residual sample values. In some embodiments, an offset is subtracted from a decoded value to generate the residual sample value as discussed herein.

Figure 2:
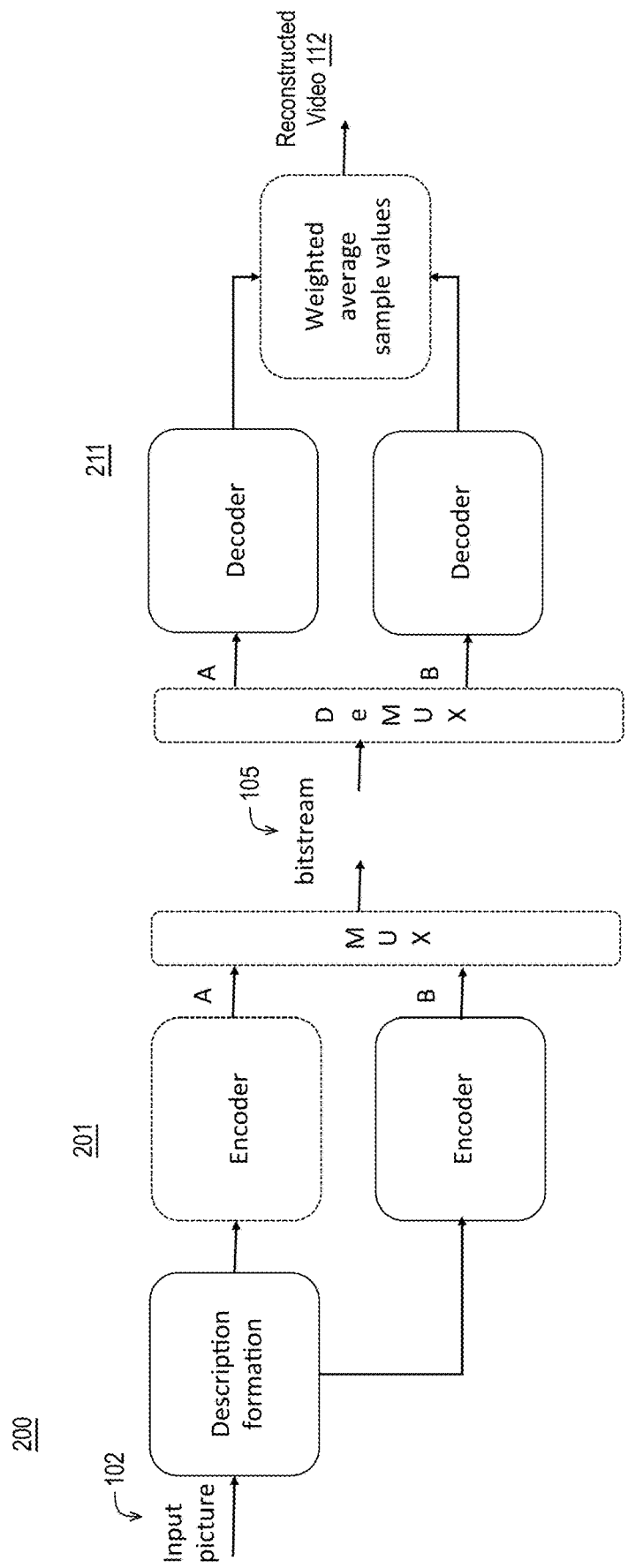
FIG. 2 is a block diagram of an example multiple description coding context including an example multiple description encoder system and an example multiple description decoder system.

FIG. 2 is a block diagram of an example multiple description coding context 200 including an example multiple description encoder system 201 and an example multiple description decoder system 211, arranged in accordance with at least some implementations of the present disclosure. Notably, coding contexts 100, 200, encoder systems 101, 201, and decoder systems 111, 211 may be combined in implementation to provide bitstream 105 with some portions coded using scalable video coding and some portions coded using multiple description coding with such portions be indicated or flagged using a scalable or multiple descriptor coding indicator. As used herein, the term scalable or multiple descriptor coding indicator is used to mean a flag that indicates scalable coding has been applied to the portion or a flag that indicates multiple description coding has been applied to the portion. When scalable coding has been applied, at decode pixel samples of the portion are generated by adding or summing a base layer pixel sample and one or more enhancement layer pixel samples. When multiple description coding has been applied, at decode pixel samples of the portion are generated by merging pixel samples from two or more descriptors such as by averaging (using simple averaging or weighted averaging) pixel values, addition of pixel samples, increasing spatial, angular, or temporal resolution by merging samples (e.g., in-between pixels, views, frames). For example, spatial resolution may be increased by spatially merging pixels (e.g., odd and even pixels provided from different descriptions) and temporal resolution may be increased by temporally merging frames (e.g., odd and even frames provided from different descriptions).

At multiple description encoder system 201, input video 102 including input pictures is received. At multiple description encoder system 201, input video 102 is decomposed into two descriptions, A and B, each of which is encoded independently of the other description via encoders A and B of multiple description encoder system 201, respectively. The resultant bitstreams are multiplexed by the multiplexer of multiple description encoder system 201 to generate resultant bitstream 105, which is transmitted to multiple description decoder system 211 or memory for eventual decode by multiple description decoder system 211.

At multiple description decoder system 211, if a single description is received, it is decoded, via a decoder of multiple description decoder system 211, and output. If multiple descriptions are received, the descriptions are decoded, via decoders of multiple description decoder system 211, and combined via a weighted averaging module, before output. To combine, sample values from the multiple descriptions are averaged, either with a simple average or a weighted average to generate reconstructed video 112. Notably, multiple description decoder system 211 can generate reconstructed video 112 with only description A, only description B, or with both descriptions A and B. Such reconstructed video 112 may be presented to a user for example.

It is noted that the MIV draft standard specifies the bitstream format and decoding process for immersive video. The Test Model for Immersive Video (TMIV) also describes a reference encoding process and rendering process, but these processes are not normative to the MIV standard.

Figure 3:
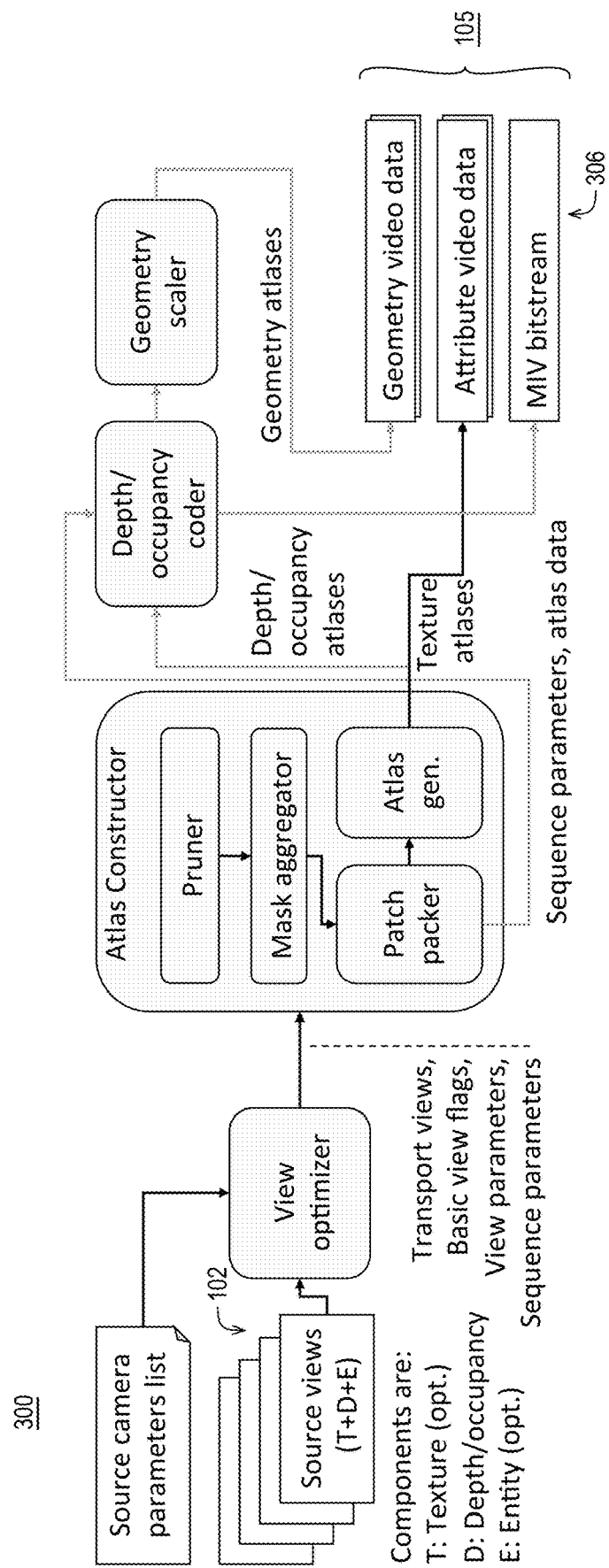
FIG. 3 is a block diagram of an example immersive video encoder.

FIG. 3 is a block diagram of an example immersive video encoder 300, arranged in accordance with at least some implementations of the present disclosure. For example, immersive video encoder 300 may employ at least portions of test encoders described by the immersive video and/or point cloud coding standards. As shown, at immersive video encoder 300, the texture (T) and depth (D) of multiple source views are input (along with optional entity data, E), each represented as a video sequence, as input video 102. A view optimizer selects which of these source views are to be coded. Patches are formed from the selected views, using pruning, and packed into one or more atlases, each of which contains a texture component and depth component. The depth (also called geometry) is further coded to account for occupancy and may be down scaled to save bandwidth. The texture and depth components of the atlases are then encoded. In some embodiments, the texture and depth components of the atlases are encoded using a standards compliant encoder such as an HEVC video encoder to generate a standards compliant bitstream.

As discussed with respect to FIGS. 1 and 2 and elsewhere herein, portions of input video 102 may be selected by immersive video encoder 300 (or encoder described herein) for coding using scalable video coding and other portions of input video 102 may be selected for coding using multiple description video coding. Such portions may be at any level (e.g., sequence, frame or picture, patch, block, etc.) and may be any type of content or video channel (e.g., texture, depth, occupancy, etc.). Such portions are then flagged or indicated in bitstream 105. Such indications may be provided in MIV bitstream 306, however, any suitable bitstream signaling may be used such as indication via a flag or coding using CABAC arithmetic coding. Such portions are then reconstructed at the decode side accordingly.

Figure 4:
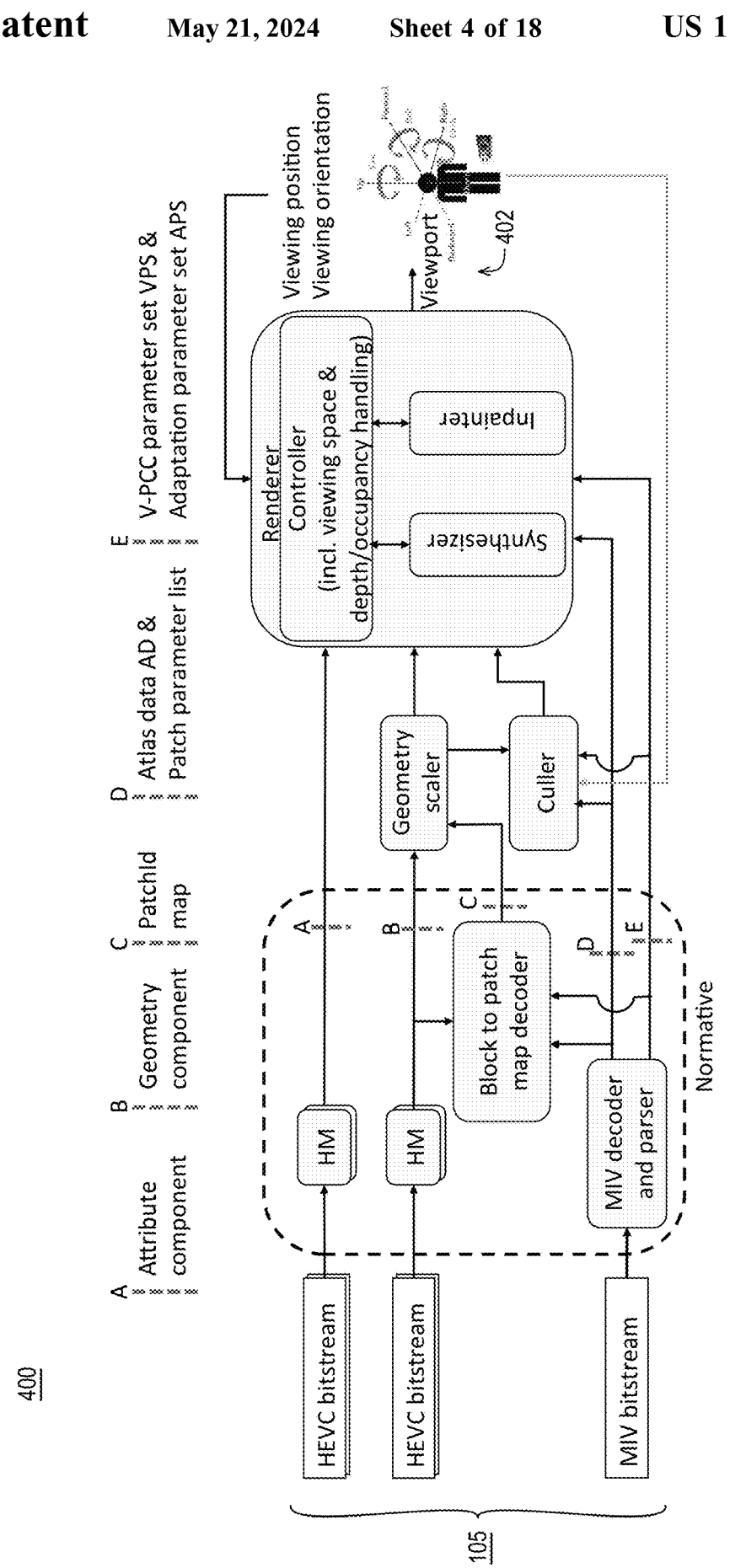
FIG. 4 is a block diagram of an example immersive video decoder.

FIG. 4 is a block diagram of an example immersive video decoder 400, arranged in accordance with at least some implementations of the present disclosure. In FIG. 4, output conformance points defined in the MIV draft standard as based on the immersive video and point cloud coding standards are indicated with letters A through E.

In FIG. 4, a coded video sequence (CVS) for each of the video-substreams for the geometry components and optionally the texture attribute is input to video decoder 400, which outputs a sequence of decoded picture pairs of synchronized decoded attribute pictures (A) and decoded geometry attribute pictures (B). The geometry and texture attributes may have the same or different resolutions. The metadata is input to a metadata parser which outputs Atlas Data (D) which includes the information of the patch list and the camera parameters list, and the general information of the V-PCC parameter set (E). The block to patch map generator takes as inputs the Atlas Data (D), which include the information of the patch list, and the general information of V-PCC parameter set (E) and outputs a block to patch map (C). In some embodiments, a view renderer takes as inputs one or more pairs of decoded geometry component atlases (B)—possibly upscaled—and texture attribute component atlases (A), the Atlas Data (D), the block to patch map sequence (C), and the viewer position and orientation, and outputs a viewport.

As discussed, immersive video decoder 400 (e.g., a decoder in compliance with the immersive video and point cloud coding standards) does not specify the reference renderer. In some embodiments, the decoder specified in the immersive video and point cloud coding standards is included within a dashed line box in FIG. 4, which excludes the reference renderer. The intended output of the reference renderer is a perspective viewport of the texture, selected based upon a position and orientation of a viewer, generated using the outputs of the immersive media decoder. The MIV standard enables the viewer to dynamically move with 6 Degrees of Freedom (6DoF), adjusting position (x, y, z) and orientation (yaw, pitch, roll) within a limited range (e.g., as supported by a head mounted display or 2-D monitor with positional inputs or the like). As an example, the previously referenced Test Model 4 for Immersive Video describes how the TMIV reference renderer can output a texture omnidirectional view or perspective viewport, according to a viewer's position and orientation.

In MIV, patches are rectangular regions formed by mapping pixels from a view to an atlas. Individual pixel positions within a patch are considered to be active or not active, indicated using an occupancy map. The per pixel occupancy map data may be signaled embedded within the depth in MIV or encoded separately. This occupancy map information is used by the decoder system during the rendering process.

A MIV encoder, such as immersive video decoder 400, forms patches from the input views, and determines which pixels within a rectangular patch are active. For example, view selection, re-projection, and pruning may be used to reduce the number of pixels from the views to be included within patches. Reducing the number of pixels in patches and atlases can reduce the bitrate and reduce the video codec encoder and decoder sample rate and hence complexity. If a particular position in 3D space is well represented by more than one view, the encoder may choose to prune pixels corresponding to that position from other views.

In some embodiments, immersive video decoder 400 may produce multiple patches representing the same position in 3D space or the same area in a view. This can be done by adjusting the pruning parameters or apply grouping approach to allow some degree of redundancy in the extracted patches. For example, the previously referenced Test Model 4 for Immersive Video describes combining the patch data when rendering, using view weighting or group-based rendering of the corresponding pixel contributions from different patches/groups.

When immersive video decoder 400 determines which pixels within a patch are active, the bitrate required for encoding the patch can be considered, and the impact it will have on image quality after rendering. Coding additional data in a patch may increase the bitrate for coding the patch, because of more active samples, although it is not necessarily the case, because an entire block must be coded by the video encoder anyway, and some value (padded or original pixels) would need to be inserted. Having additional active samples may be useful for improving subjective quality upon rendering, because reducing video quality in the coded view can result in visible artifacts in the rendered viewport, especially near object edges.

In the previously referenced Test Model 4 for Immersive Video (TMIV), it is possible to have more than one patch representation of a particular sample position in a view due to the techniques used for formation of patches. This can be done by adjusting the depthParameter, maxDepthError of the hierarchal pruner to have more tolerance of producing more similar patches. For example, the TMIV may fill the entire patch with active occupied samples. Thereby, multiple samples may be provided for the same position in 3D space. As discussed further herein, such multiple samples may be coded using scalable video coding or multiple description coding.

In some embodiments, bitstream 105 received at immersive video decoder 400 includes one or more first indicators indicating corresponding first portion(s) of the immersive video are coded using scalable video coding and one or more second indicators indicating corresponding second portion(s) of the immersive video are coded using multiple description coding Immersive video decoder 400 decodes such first portion(s) (indicated as being coded using scalable video coding by the one or more first indicators) using scalable video decoding techniques including determining pixel samples for each pixel location of the first portions in a base layer, determining pixel residuals for each pixel location of first portion in an enhancement layer, and summing the pixel samples and the pixel residuals to determine a final pixel value or sample for each pixel location. It is noted that one or more enhancement layers may be used. Furthermore, the pixel residuals may be determined by removing an offset as discussed herein. Such final or resultant pixel values (or at least some of the final or resultant pixel values) are then displayed to a user via viewport 402.

Furthermore, immersive video decoder 400 decodes such second portion(s) (indicated as being coded using multiple descriptor video coding by the one or more second indicators) using multiple descriptor decoding techniques including determining pixel samples for a first descriptor for each pixel location of the second portions, determining pixel samples for a second descriptor for each pixel location of the second portions, and averaging the pixel samples for the first and second descriptors to determine a final pixel value or sample for each pixel location. It is noted that two or more descriptors may be used. The final or resultant pixel values (or at least some of the final or resultant pixel values) are then displayed to a user via viewport 402. In some embodiments, both pixel samples generated using scalable video decoding techniques and pixel samples generated using multiple descriptor video coding techniques are displayed to a user, either simultaneously or at different times.

Discussion now turns to patch formation from selected views in immersive video. As discussed, selection of portions of immersive video for scalable video coding or multiple descriptor video coding may be made at any level and for any content type of the immersive video. For example, such selections may be made at the video sequence level, picture level, access unit level, atlas level, or patch level (with a scalable or multiple descriptor coding indicator being an indicator for one of a video sequence, a picture, an access unit, an atlas, or a patch) for any of texture, attribute, depth geometry, etc.

Figure 5:
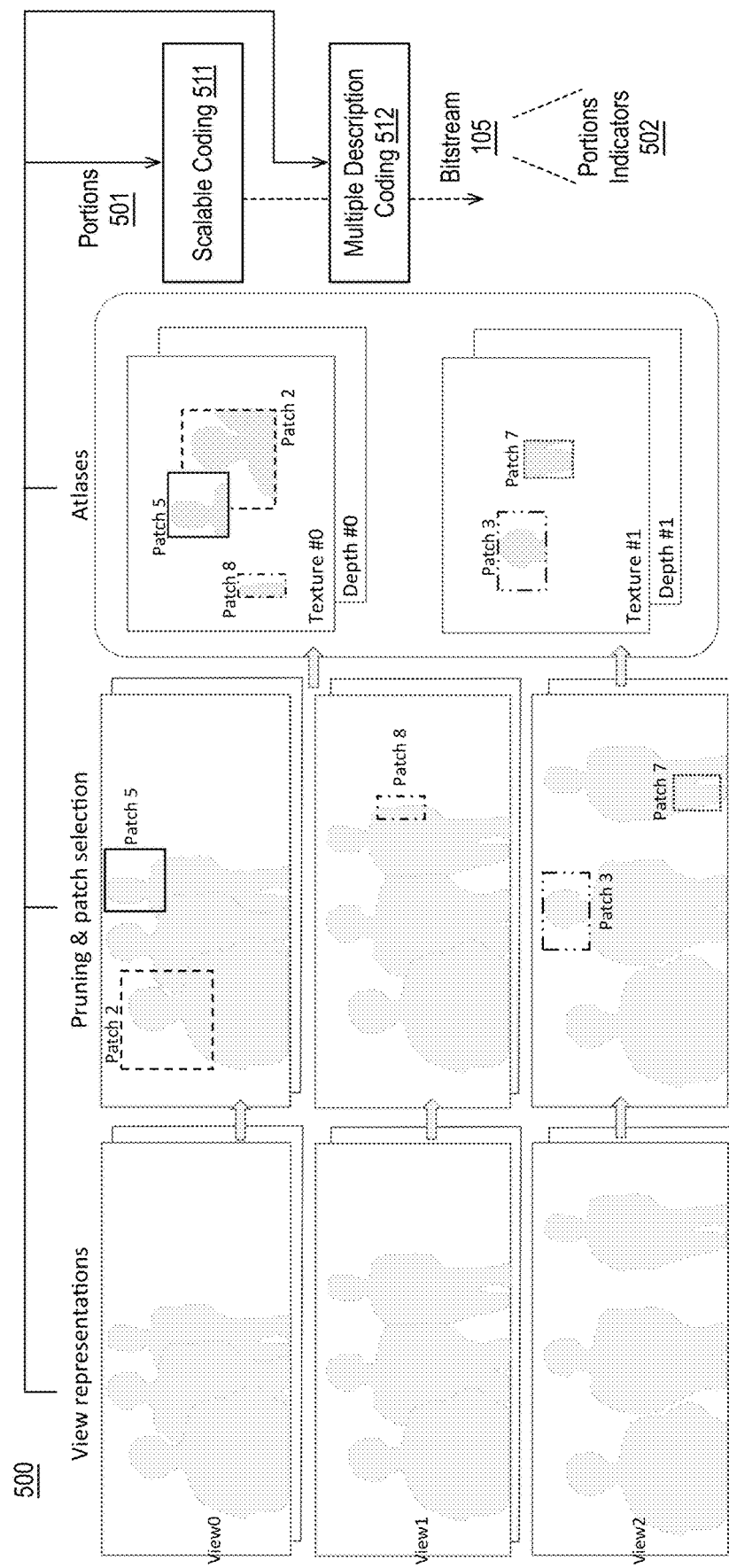
FIG. 5 illustrates example patch formation from selected views and example selective application of scalable video encoding and multiple description video encoding.

FIG. 5 illustrates example patch formation 500 from selected views and example selective application of scalable video encoding and multiple description video encoding, arranged in accordance with at least some implementations of the present disclosure. As shown in FIG. 5, patches are selected from within selected views (e.g., View0, View1, View2) including exemplary patches 2, 3, 5, 7, 8. Such patches are selected using pruning and clustering techniques. The selected patches are packed into one or more atlases as shown with respect to patches 2, 5, 8 being packed into a first atlas and patches 3, 7 being packed into a second atlas. Such atlases are then coded as discussed herein. In addition, in the context of multiple description coding, such patches may include representations of the same locations within the views such that the pixel samples of the locations with more than one location may be averaged at decode as discussed herein.

Also as shown, scalable coding module 511 and/or multiple description coding module 512 may receive any of such portions 501 (e.g., atlases, patches, views, sequences, etc.) for coding. An encoder system as discussed herein determines whether particular portions 501 are coded using scalable coding module 511 or multiple description coding module 512 and such portions 501 are flagged with portion indicators 502 in bitstream 105 such that a portion coded using scalable coding is flagged with a scalable coding indicator and another portion coded using multiple description coding is flagged with a multiple description coding indicator. The coding of such portions is performed as discussed herein with multiple description coding providing coding of separate portions that both have representations of some positions and with scalable coding base and enhancement layer coding for each portion as discussed further herein below.

Figure 6:
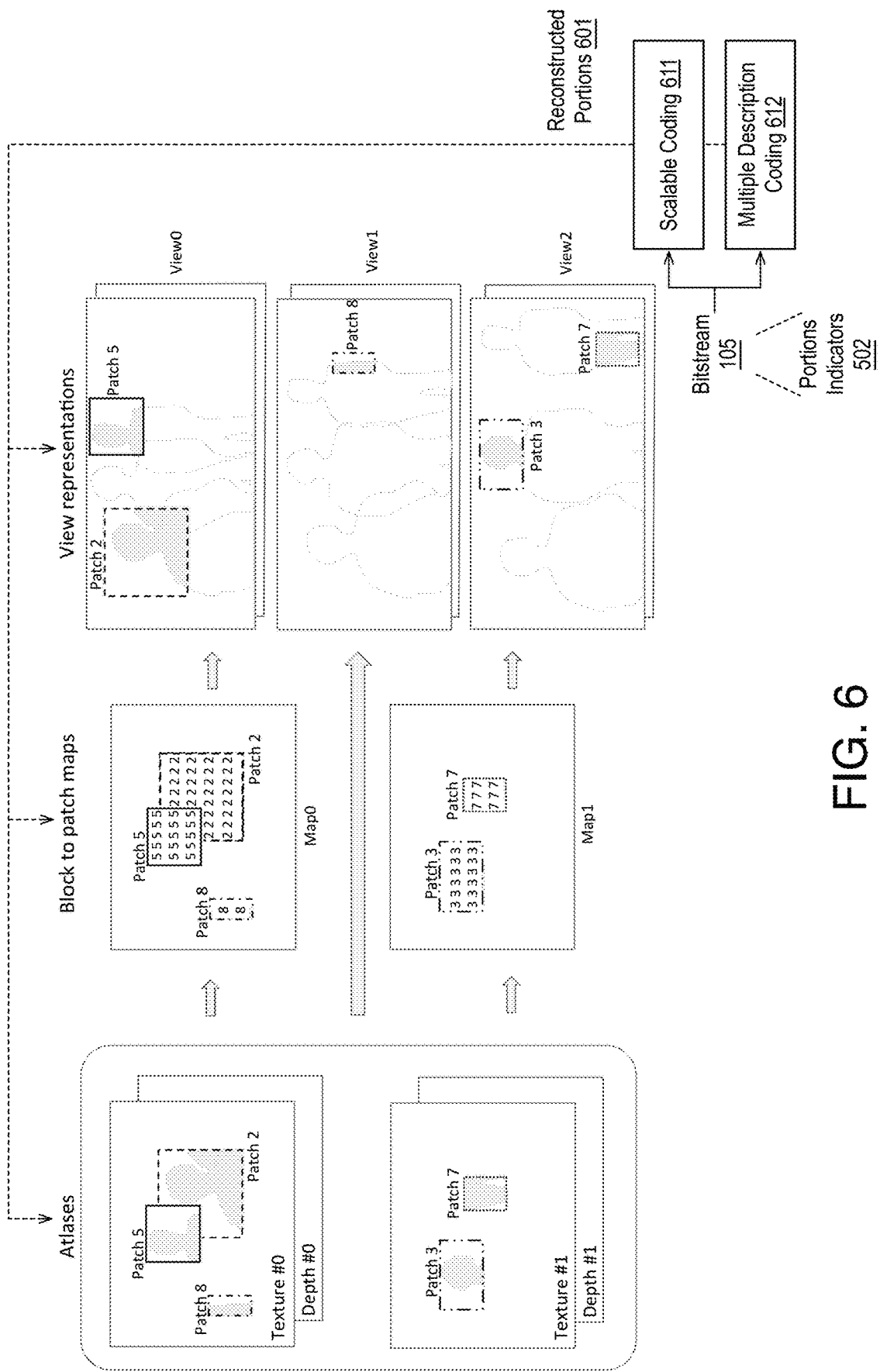
FIG. 6 illustrates example reconstruction of pruned views from atlas patches and example selective application of scalable video decoding and multiple description video decoding.

FIG. 6 illustrates example reconstruction of pruned views from atlas patches and example selective application of scalable video decoding and multiple description video decoding, arranged in accordance with at least some implementations of the present disclosure. As shown in FIG. 6, atlases are decoded and include exemplary patches 2, 3, 5, 7, 8 with patches 2, 5, 8 being decoded in a first atlas and patches 3, 7 being decoded in a second atlas. Such patches or blocks are matched to views using block to patch maps as illustrated to provide the decoded patches 2, 3, 5, 7, 8 within the relevant selected view (e.g., View0, View1, View2). Thereby, at least portions of the selected views are reconstructed at decoder 300 for use in viewport generation and other operations. It is noted that both texture and depth may be encoded and decoded using such patch formation and reconstruction techniques.

Also as shown, scalable coding module 611 and/or multiple description coding module 612 receive immersive video bitstream 105 inclusive of portion indicators 502. Portions of immersive video represented by bitstream 105 are routed to scalable coding module 611 or multiple description coding module 612 based on portion indicators 502. Portions flagged as coded using scalable coding are routed to scalable coding module 611 and portions flagged as coded using multiple description coding are routed to multiple description coding module 612. Multiple description coded portions are decoded at least in part by averaging decoded pixel samples from a first description and decoded pixel samples from a second description such that the first and second descriptions both correspond to the same position in the immersive video (within a threshold). Two or more descriptions may be used.

Scalable video coding portions are decoded at least in part by summing decoded pixel samples corresponding to the multiple description coded portions portion. Such summing may include summing a base layer pixel sample (i.e., a pixel value) and an enhancement layer pixel sample (i.e., a residual value). One or more enhancement layer pixel samples may be used. In some embodiments, the residual value is generated by subtracting an offset from a decoded value of the enhancement layer as discussed herein.

As shown, such reconstructed portions 601 (e.g., atlases, patches, views, sequences, etc.) corresponding to portions 501 may be provided at any level with an decoder and/or rendering system. Notably, the decoder and renderer do not determine whether reconstructed portions 601 are coded using multiple description or scalable coding but instead decode and/or reconstruct the video content of reconstructed portions 601 based on portion indicators 502 provided by the encoder system.

Discussion now turns to different implementations of multiple description coding (FIGS. 7-9) and scalable video coding (FIGS. 10-12) being performed at different levels and in different contexts. Notably, such contexts may be employed in the same encoder and/or decoder systems.

Figure 7:
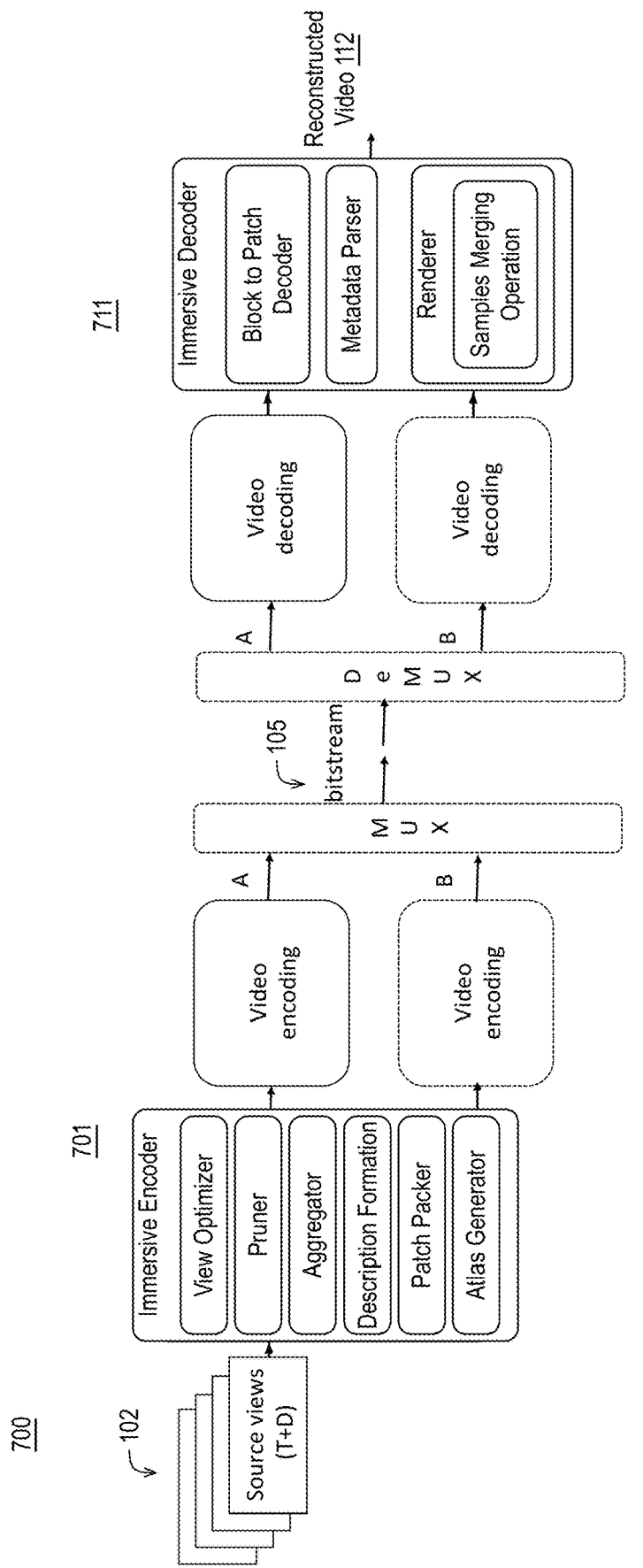
FIG. 7 is a block diagram of an example multiple description coding context including an example multiple description encoder system and an example multiple description decoder system.

FIG. 7 is a block diagram of an example multiple description coding context 700 including an example multiple description encoder system 701 and an example multiple description decoder system 711, arranged in accordance with at least some implementations of the present disclosure. For example, multiple description coding context 700 may operate on patches in the immersive encoder. As shown in FIG. 7, multi-description coding may be performed as part of the MIV encoding process and the multiple description samples (e.g., for the same 3D position) are merged back later during the MIV decoding stage as shown with respect to the immersive decoder of decoder system 711. In some embodiments, the immersive encoder selects multiple samples for the same position in 3D space and allocates the samples between multiple descriptions. For example, if two samples for the same position in 3D space are available, one may be allocated to one description and another to the second description. In other examples, multiple samples may be applied to one or more of the descriptions and/or more than two descriptions may be used. Each such description is then separately encoded to generate separate bitstreams (e.g., A and B). In some embodiments, the two samples for the same position in 3D space may be from different views that have been reprojected.

When bitstreams A and B are both received, decoder system 711 decodes both and, for a 3D position having multiple samples, the samples are merged as discussed herein to generate a final pixel value for the position in 3D space. Such merging of pixel samples from two or more descriptors may be performed by averaging (using simple averaging or weighted averaging) pixel values, addition of pixel samples, increasing spatial, angular, or temporal resolution by merging samples, or the like. As discussed above, if only one of bitstreams A and B is received (e.g., due to low bandwidth, one bitstream being corrupted, etc.), the received bitstream is decoded and the decoded sample is used for the 3D position. Therefore, bitstreams A and B separately may reconstruct the source views although not with the quality of using both.

Figure 8:
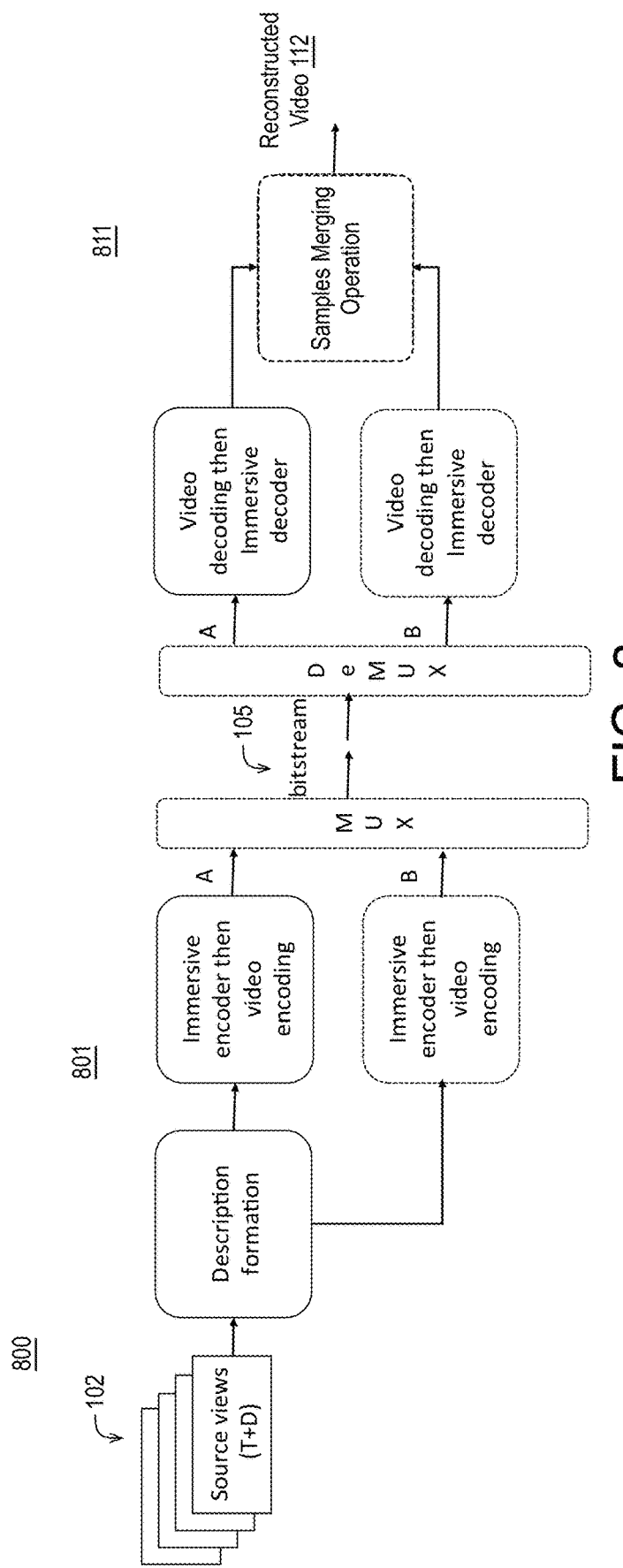
FIG. 8 is a block diagram of another example multiple description coding context including an example multiple description encoder system and an example multiple description decoder system.

FIG. 8 is a block diagram of another example multiple description coding context 800 including an example multiple description encoder system 801 and an example multiple description decoder system 811, arranged in accordance with at least some implementations of the present disclosure. For example, multiple description coding context 800 may operate on views inputted to the immersive encoders. As shown in FIG. 8, in a variant using multiple groups (e.g., grouping input views in different clusters and encoding them separately), multiple description coding context 800 can enforce having more patches of important objects in a scene (e.g., foreground objects, occluded regions, etc.). Such multiple groups may be separately encoded and, when all available bitstreams are available, they may be merged as discussed above. Such merging of pixel samples from two or more descriptors may be performed by averaging (using simple averaging or weighted averaging) pixel values, addition of pixel samples, increasing spatial, angular, or temporal resolution by merging samples, or the like. This modified TMIV encoding approach is similar to multiple description coding for an immersive video coding because a particular position in 3-D space or in a particular view projection can be represented in more than one patch. In the TMIV renderer, if a position in 3-D space is represented by patches in more than one view, the rendered value for that position performs a weighted average of the contributing samples from the multiple patches, with the weights determined by the parent views the patches are pruned against and the relative distance of the corresponding views from the current viewport position or applies a group-based rendering approach to consider contributions from related patches across different groups. This rendering operation is similar to that for a multiple description decoder, with the separate views considered as separate descriptions. In this case, the renderer uses a weighted average rather than a simple average to combine the descriptions from separate views.

Figure 9:
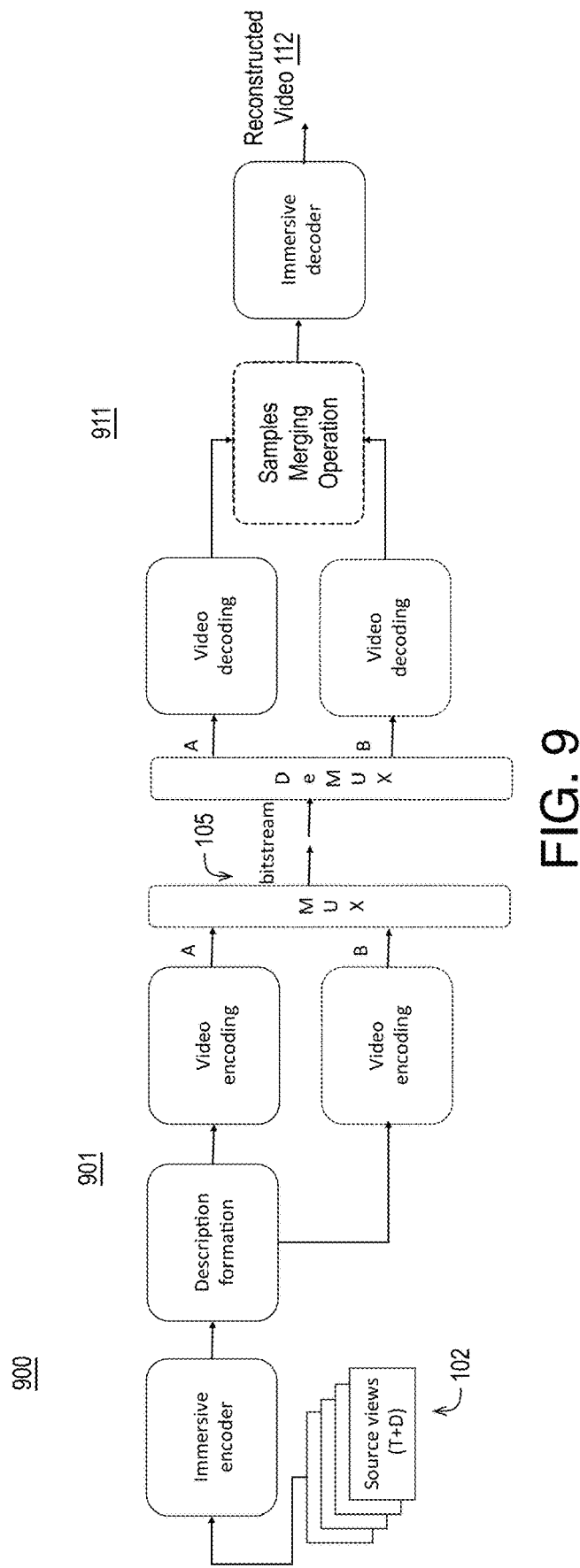
FIG. 9 is a block diagram of another example multiple description coding context including an example multiple description encoder system and an example multiple description decoder system.

FIG. 9 is a block diagram of another example multiple description coding context 900 including an example multiple description encoder system 901 and an example multiple description decoder system 911, arranged in accordance with at least some implementations of the present disclosure. For example, multiple description coding context 900 may operate on atlases outputted by the immersive encoder. As shown, in FIG. 9, in another variant of multiple description coding, multi-description coding may be applied to the atlases outputted by the MIV encoder. In some embodiments, a subsampling process applied directly to a texture atlas, a geometry atlas, or both such that spatial pixels of odd locations can represent one description (e.g., as represented by bitstream A) and those of even locations (per dimension) can represent another description (e.g., as represented by bitstream A). For example, the spatial pixels may be separated by multiple description encoder system 901 and merged by multiple description decoder system 911. Video coding is applied, via the encoders of multiple description encoder system 901, on the various descriptions to generate the relevant bitstreams. Multiple description decoder system 911 decodes the received bitstreams and reverses the operations to reconstruct the original atlases before applying the MIV decoding process.

The V-PCC codec, as referenced with respect to the immersive video and point cloud coding standards, includes similar functional blocks to those in MIV. In V-PCC, point clouds are coded using projection of texture and depth (called geometry) onto planes representing a bounding rectangular solid. Patches are formed from the 3D surfaces, and mapped to a particular projection plane based, for example, on whichever plane has the closest normal to the surface area for the patch. The patches are packed into canvases, which are similar to MIV atlases.

In some embodiments, for each projection plane, two images are created, a near layer and a far layer, in order to address the situation that arises when more than one point is mapped to the same pixel position in the planar projection. For some patches, both the near layer and far layer are coded, while for other patches only the near layer is coded.

Figure 10:
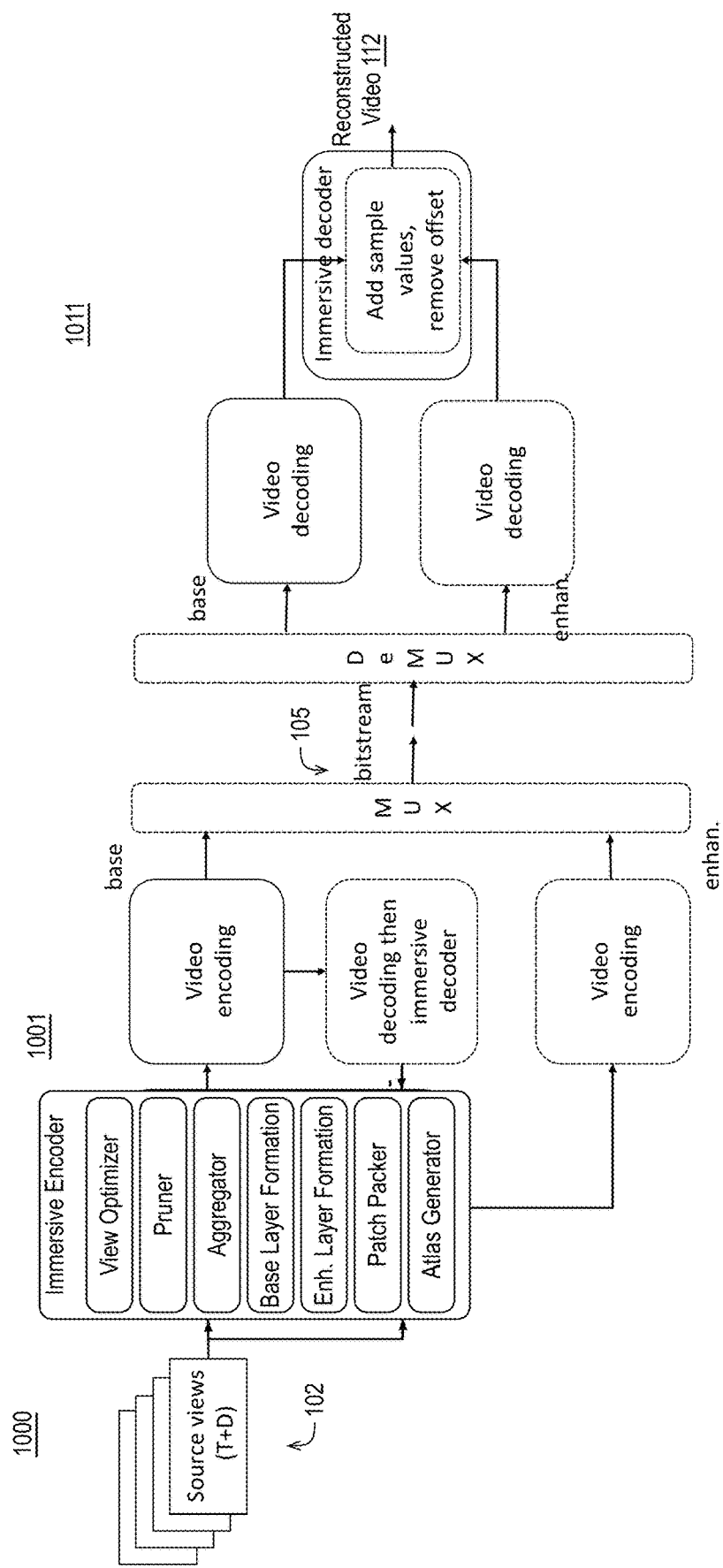
FIG. 10 is a block diagram of an example scalable coding context including an example scalable encoder system and an example scalable decoder system.

FIG. 10 is a block diagram of an example scalable coding context 1000 including an example scalable encoder system 1001 and an example scalable decoder system 1011, arranged in accordance with at least some implementations of the present disclosure. For example, multiple description coding context 1000 may operate on patches within the immersive encoder. As shown, in FIG. 10, when the far layer is present for a patch, the near and far layers can be scalably encoded, with the far layer coded differentially with respect to the near layer. For example, the near layer may be treated as a base layer and the far layer may be treated as an enhancement layer. In some embodiments, an offset is used to move the near layer difference sample values into a non-negative range for coding with a normal video codec as discussed herein. In some embodiments, when rendering points from the decoded near layer, the decoded sample value is first added to the corresponding far layer sample value, and the offset is subtracted. Notably, as illustrated, the base and enhancement layers may be generated in an immersive encoder itself. Herein, the terms near layer and far layer are used in accordance with their use in the immersive video and point cloud coding standards.

Furthermore, coding multiple layers in V-PCC can reduce subjective artifacts when viewing projections of the output point clouds, where incorrect gaps are visible in objects, with the background incorrectly being visible instead of the object at some locations. In some embodiments, using scalable coding of the far layer with respect to the near layer can reduce the bitrate required to code the far layer, because the near layer and far layer are highly correlated. In some embodiments, the near and far layer may be considered to be within the same patch. In some embodiments, the near and far layers are considered to be in separate patches. Signaling can be added to efficiently represent the patch parameters (e.g., size, position, rotation, view_id) of a patch by referring to the parameters of the previously coded patch.

Figure 11:
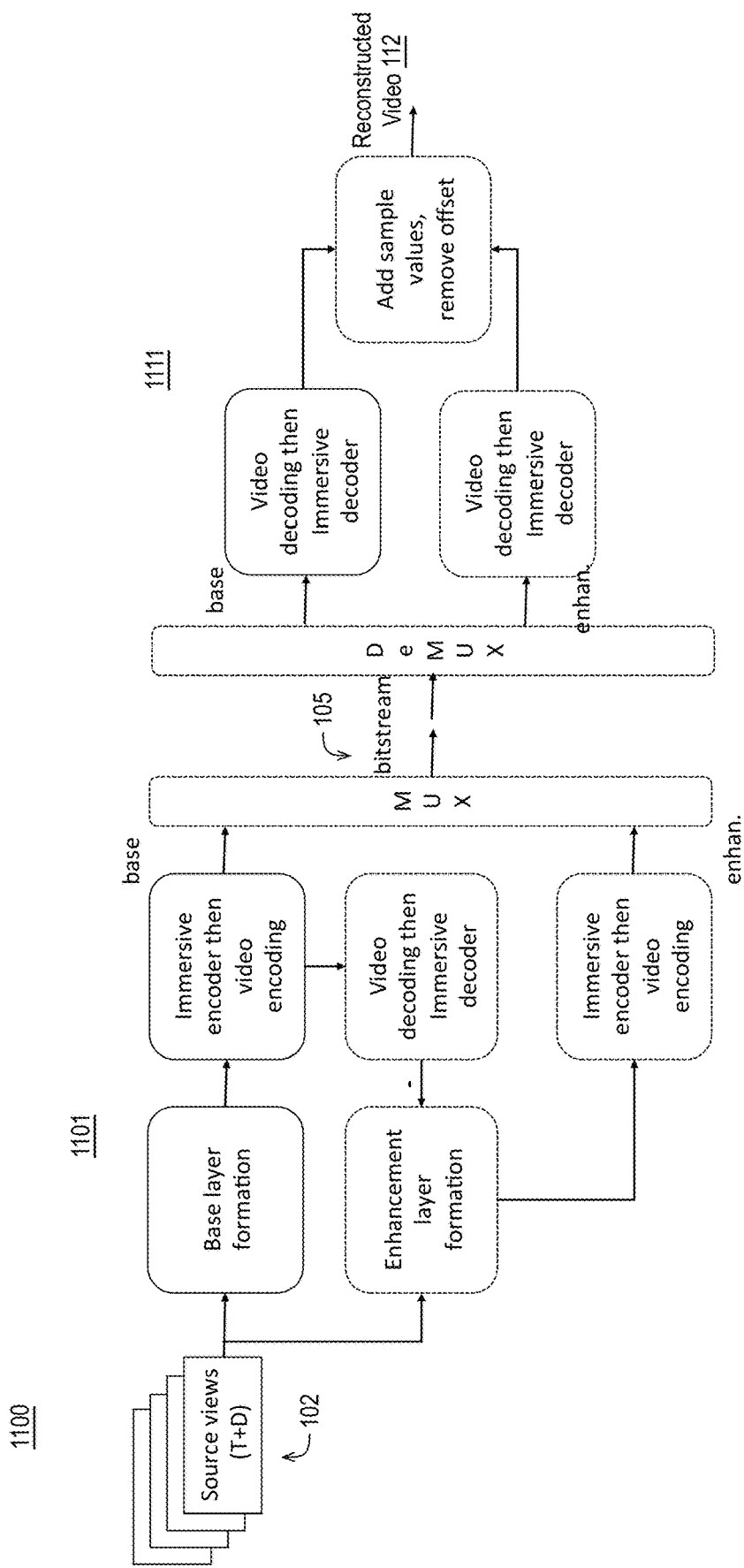
FIG. 11 is a block diagram of another example scalable coding context including an example scalable encoder system and an example scalable decoder system.

FIG. 11 is a block diagram of another example scalable coding context 1100 including an example scalable encoder system 1101 and an example scalable decoder system 1111, arranged in accordance with at least some implementations of the present disclosure. For example, multiple description coding context 1100 may operate on views inputted to the immersive encoders. As shown, in FIG. 11, in some embodiments, scalability is applied on the input views (i.e., projections of the point clouds) to produce base and enhancement layers. In some embodiments, high pass filtering in the frequency domain is applied to the spatial views such that low and mid frequency layers form the base layer and the high frequency layers form the enhancement layer of the views. Such band pass filtering may be performed using any suitable technique or techniques used in the art. In some embodiments, the frequency information in the base layer is sufficient to reconstruct the views while the enhancement layer high frequency information may add to it to produce a higher resolution version when the enhancement layer bitstream is available.

In some embodiments, immersive video coding is applied to the low and mid frequency layers (e.g., the base layer) to generate texture and depth atlases and the texture and depth atlases are encoded (e.g., using a standards compliant encoder). The resultant bitstreams are decoded using the same standard (e.g., using a standards compliant decoder) and the pertinent immersive video decode to generate reconstructed versions of the low and mid frequency layers (e.g., the base layer). The reconstructed versions are then differenced with the source views to generate an enhancement layer (e.g., inclusive of the high frequency layer and other residual), and immersive video coding is applied to the enhancement layer to generate texture and depth atlases, which are encoded (e.g., using a standards compliant encoder). The resultant bitstreams are provided to scalable decoder system 1111, which performs decode using the same standard (e.g., HEVC) and the immersive video decode to generate reconstructed versions of the low and mid frequency layers (e.g., the base layer). If only the base layer is available it is used by scalable decoder system 1111. If the enhancement layer bitstream is also available, it is decoded using the same standard (e.g., HEVC) and the immersive video decode to generate a reconstructed versions of the enhancement layer. The base and enhancement layers are then summed and the offset is removed to generate reconstructed source views.

Figure 12:
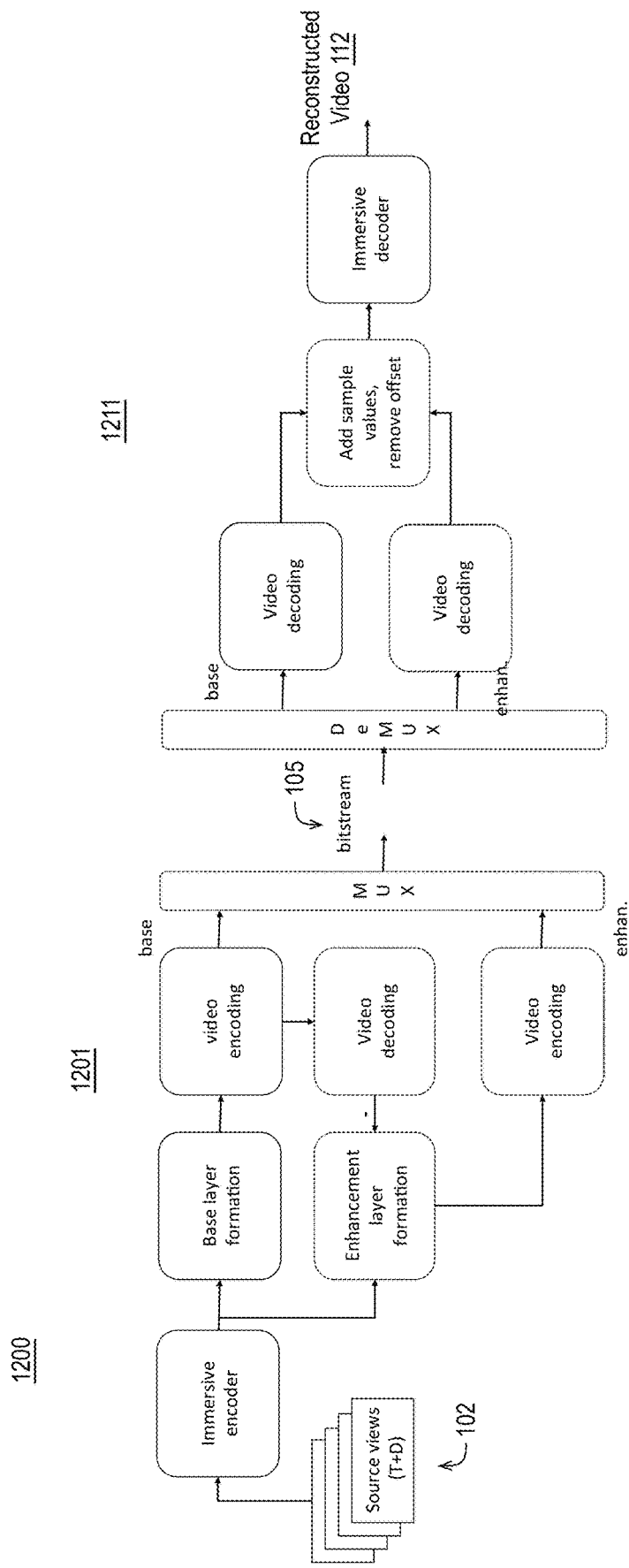
FIG. 12 is a block diagram of another example scalable coding context including an example scalable encoder system and an example scalable decoder system.

FIG. 12 is a block diagram of another example scalable coding context 1200 including an example scalable encoder system 1201 and an example scalable decoder system 1211, arranged in accordance with at least some implementations of the present disclosure. For example, multiple description coding context 1100 may operate on atlases outputted by the immersive encoder. As shown, in FIG. 12, in some embodiments, scalability is applied to the atlases resulting from the immersive encoding process by applying a filtering process similar to that discussed above with respect to FIG. 11 before the video coding and reversing the processes at the decoding side.

In some embodiments, immersive video coding is applied to the source views to generate texture and depth atlases. Then, high pass filtering in the frequency domain is applied to the texture and depth atlases such that low and mid frequency layers form the base layer and the high frequency layers form the enhancement layer of the views. Such band pass filtering may be performed using any suitable technique or techniques used in the art. As shown, the resultant base layer texture and depth atlases are encoded using a standards based encoder such as HEVC decoder. The resultant bitstream is provided as a base layer bitstream and decoded to generate reconstructed versions of the texture and depth atlases. The reconstructed versions of the texture and depth atlases are differenced with the original texture and depth atlases to generate an enhancement layer (e.g., inclusive of the high frequency layer and other residual), and the enhancement layer is encoded to generate an enhancement layer bitstream. The resultant bitstreams are provided to scalable decoder system 1211, which performs decode using the same standard (e.g., HEVC) and the immersive video decode to generate reconstructed versions of the low and mid frequency layers of the texture and depth atlases (e.g., the base layer). If only the base layer is available, it is decoded using immersive video decoding to reconstruct the source views. If the enhancement layer bitstream is also available, it is decoded using the same standard (e.g., HEVC) to generate an enhancement layer reconstruction of the texture and depth atlases and the base layer and enhancement layer reconstructions of the texture and depth atlases are summed, the offset is removed, and the resultant reconstructed versions of the of the texture and depth atlases are used in the immersive video decode to generate reconstructed source views.

Discussion now turns to scalability and multiple description signaling and implementation. In some embodiments, both scalable and multiple description modes of operation may be supported in an immersive video codec system. In some embodiments, a signal is provided in the bitstream to indicate whether scalable or multiple description coding is employed. The signaling may be provided for an entire coded video sequence, for a coded picture or access unit, for an atlas, or on a per patch basis. In some embodiments, a flag is used, either as a single bit, or coded using arithmetic coding, such as CABAC. If signaled on a per patch basis, the flag may be included in the same syntax structure as other patch-related data. If signaled on a per atlas basis, the flag can be included in the same syntax structure as other atlas-related data.

While scalable video coding is generally more coding efficient than multiple description coding for coding of entire pictures, that is not necessarily the case for patch based coding which contain varying sized rectangular region patches with per pixel occupancy. In some embodiments, it may be more bitrate efficient to fill in and occupy an entire block due to block transform and quantization as well as inter-picture reference prediction. The scalable vs. multiple description mode can be applied to texture and/or to depth, and/or to any additional attributes coded (such as normal, reflectance). An encoder can make the decision of which mode to use, where to be invoked (on inputted views, within the encoding process, or on the outputted atlases), and how many layers to be used, based on tradeoffs between bitrate for coding the patch and expected impact on video quality of a rendered viewport. In some embodiments, a rate distortion optimization calculation is used in the encoder to make such mode decisions.

The decoder system (including the renderer) uses the signaled information to determine how and where to combine the contributions from multiple patches that correspond to the same view position or 3D position. There may be any number of patches, views, or atlases that contribute. If multiple description coding is indicated, the decoder system will merge the samples (e.g., using a weighted average of the contributing samples). If scalable coding is indicated, the decoder system will add the contributing samples together and subtract the offset as discussed herein. This combining operation can be done at any stage of the decoding, reprojection, and rendering process.

Furthermore, at the decoder system, implementations may choose different methods of computing the weighted average. For example, this operation does not need to be standardized if the rendering method is not standardized, such as in MIV, which means that each decoder system can select the specific method for applying the weighted average. In some embodiments, equal weights are used. In some embodiments, unequal weights are used. Such unequal weights may be determined by a variety of criteria using any suitable technique or techniques. In some embodiments, weighting is applied first for all contributors from a single view, before combining the contributors from across views. In some embodiments, applying the weighting is done in place, as each new contributor pixel is identified.

Figure 13:
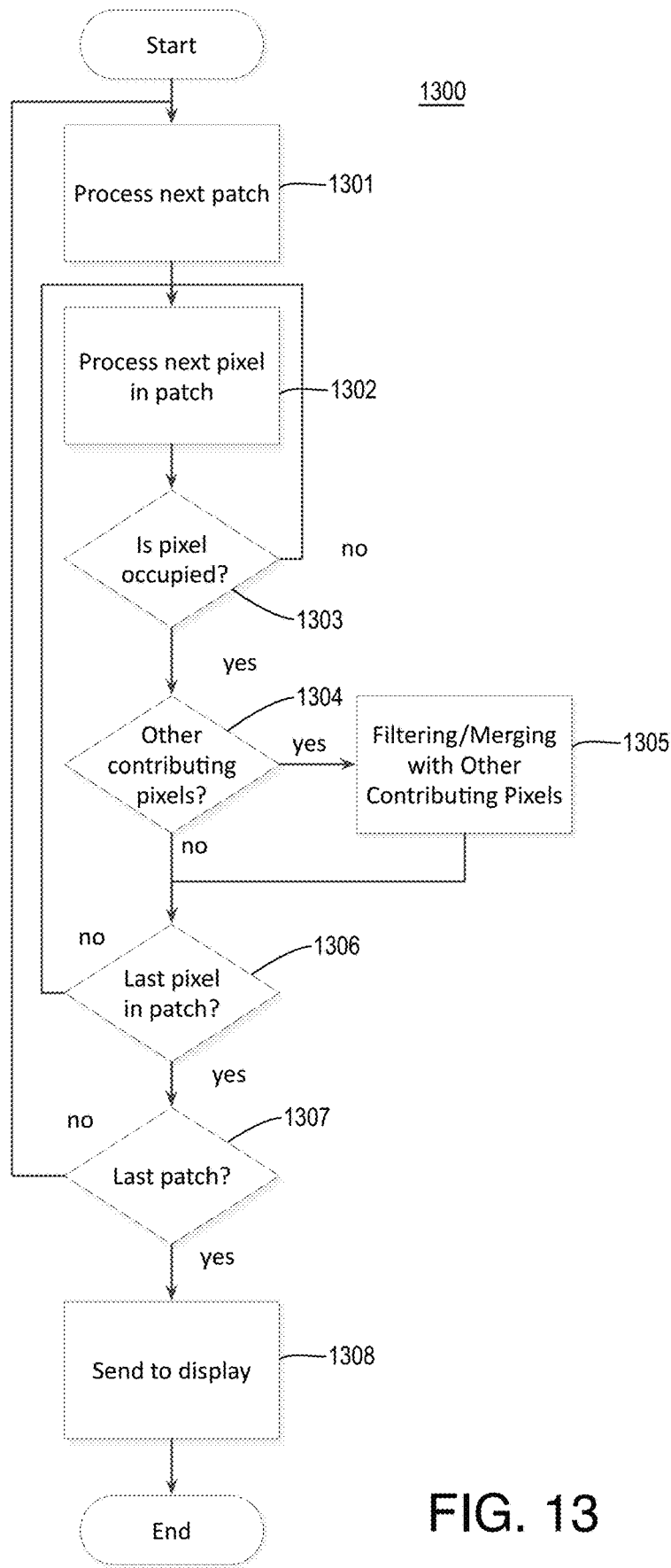
FIG. 13 illustrates an example process for immersive video decoding and/or rendering using multiple description coding.

FIG. 13 illustrates an example process 1300 for immersive video decoding and/or rendering using multiple description coding, arranged in accordance with at least some implementations of the present disclosure. As shown in FIG. 13, after a start operation, at operation 1301, a first patch is selected (or a next patch in subsequent iterations). Although illustrated with respect to processing a patch, any suitable portion of immersive video such as an atlas, view, or the like may be processed using the discussed techniques. Next, at operation 1302, a first pixel is selected (or a next pixel in subsequent iterations) within the selected patch. Although illustrated with respect to pixel processing, any suitable level of processing may be provided such as evaluation of pixels, patches, views, etc. For the selected pixel, at operation 1303, a determination is made as to whether the pixel is occupied. If not, processing is bypassed for the pixel and a next pixel is selected at operation 1302. If the pixel is occupied processing continues at operation 1304, where a determination is made as to whether there are other contributing pixels (e.g., samples). Although illustrated at the pixel level, other levels of contribution may be used such as other contributing views, other contributing frames (for temporal merging), other contributing pixel locations (for spatial merging), etc. If so, at operation 1305, the pixel samples are merged using any techniques discussed herein. In some embodiments, a weighted average or a simple average of the selected pixels and other contributing pixels is generated and used as a final result for the pixel. In some embodiments, pixel samples are merged spatially (e.g., to increase resolution by merging even and odd pixels) or temporally (to increase frame rate by merging temporally even and odd frames, patches, views, or atlases). If there are no other contributing pixels, the selected pixel sample itself is used as the final result for the pixel. After the determination of the result for the pixel (e.g., weighted average, simple average, or one pixel value only), patch (e.g., pixel averaging, spatial pixel merging, temporal merging, etc.), atlas (e.g., pixel averaging, spatial pixel merging, temporal merging, etc.), view (e.g., pixel averaging, spatial pixel merging, temporal merging, etc.), or frame (e.g., pixel averaging, spatial pixel merging, temporal merging, etc.), a determination is made at operation 1306 as to whether the pixel is the last pixel in the patch. If not, processing continues iteratively for all pixels in the patch. If so, processing continues where a determination is made at operation 1307 as to whether the patch is the last patch (or other video portion) to be processed. If not, processing continues iteratively for all patches (or other video portion) needed for the current display iteration. If so, processing continues at a send to display operation 1308 where the rendered patches (or other video portions) are transmitted for display, to memory for eventual display or other processing, etc.

As shown in the process of FIG. 13, for each pixel in each patch (or other video portion), if additional contributing pixels in other patches have been processed for that same position in a rendered viewport, a weighted average (or simple average) may be performed on the contributing pixels at that position. Such processing is performed in response to a signal or flag indicating the patch (or other video portion) is to be processed using multiple description decoding and rendering. Notably, even for a patch (or other video portion) that is processed using multiple description coding, some samples may be processed without other contributing pixels from other descriptions.

Figure 14:
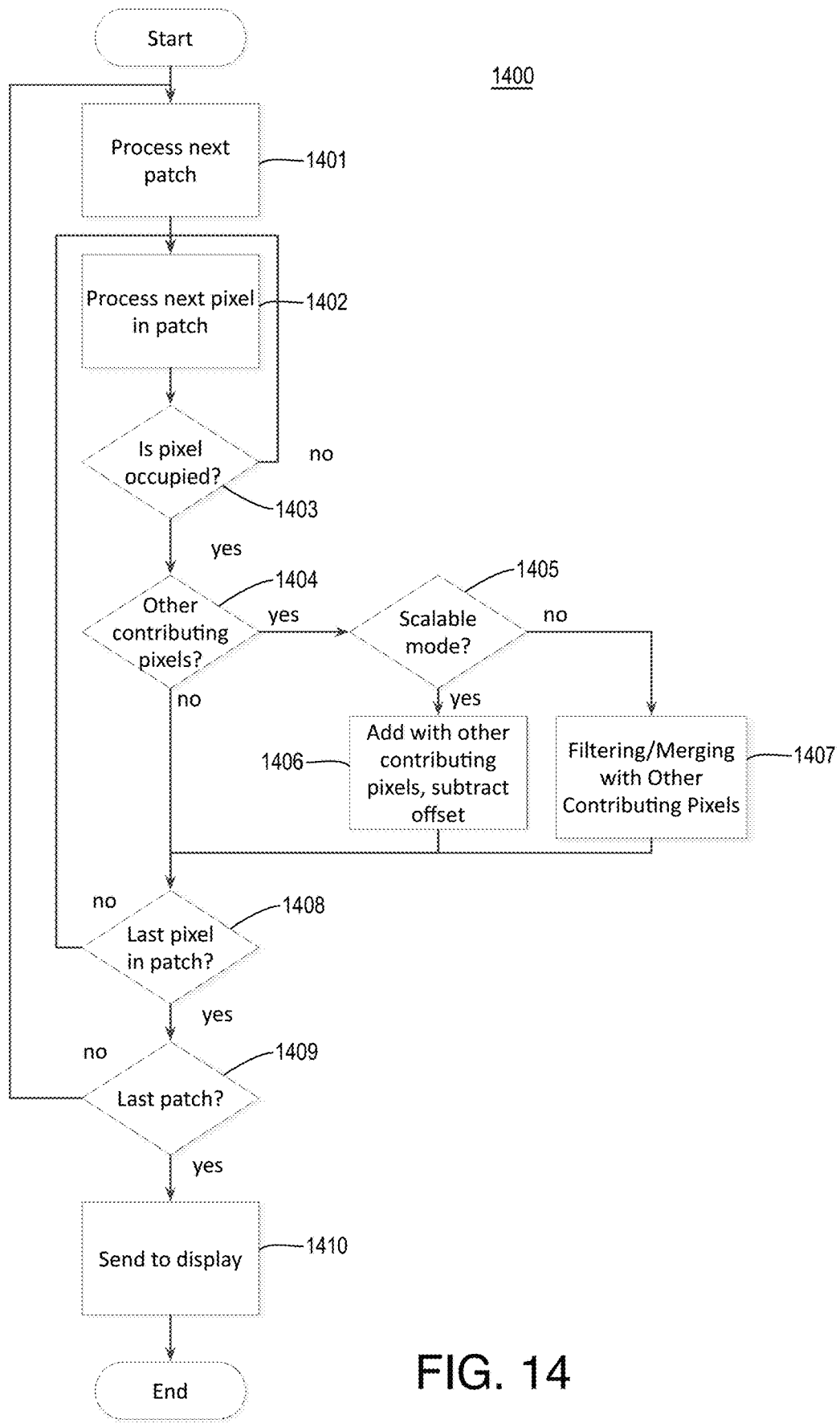
FIG. 14 illustrates an example process for immersive video decoding and/or rendering using multiple description coding or scalable video coding based on a received indicator.

FIG. 14 illustrates an example process 1400 for immersive video decoding and/or rendering using multiple description coding or scalable video coding based on a received indicator, arranged in accordance with at least some implementations of the present disclosure. For example, an immersive video bitstream may be received that includes first scalable or multiple descriptor coding indicators corresponding to first portions of immersive video and second scalable or multiple descriptor coding indicators corresponding to second portions of the immersive video such that the first portions are to be decoded and/or rendered using multiple descriptor coding in response to the first scalable or multiple descriptor coding indicators indicating multiple descriptor coding for the first portions and the second portions are to be decoded and/or rendered using scalable video coding in response to the second scalable or multiple descriptor coding indicators indicating scalable video coding for the second portions.

In response thereto, the first portions are generated by averaging first and second decoded pixel samples corresponding to the first portions or otherwise merging the first and second decoded pixel samples in accordance with multiple description coding techniques discussed. For example, for one or more pixel samples of the first portions, multiple samples are decoded (for the same or similar position), one for each of the available descriptors. The multiple samples are then averaged to generate a final pixel sample for each position. Notably, the averaging (either weighted or simple) improves the resultant pixel value or sample for the position. In other embodiments, multiple description coding merges pixel samples (or patches, atlases, views, frames, etc.) spatially (e.g., merging even and odd samples to increase resolution), temporally (e.g., merging even and odd temporal instances to increase frame rate), or the like.

Furthermore, in response to the discussed indicators indicating scalable video coding, the second portions are generated by summing first and second decoded pixel samples in accordance with scalable video coding techniques. For example, the first decoded pixel samples correspond to a base layer and the second decoded pixel samples are residual values that correspond to (one or more) enhancement layers. The residual values may be generated by subtracting an offset from decoded sample values as discussed herein. Notably, the base layer pixel samples are improved or enhanced by the residual values of the enhancement layer.

In the context of FIG. 14, the scalable or multiple descriptor coding indicators may be at any level such as patch (as illustrated), atlas, view, etc. or even at the pixel level. For each such video portion, when other contributing pixel values (another description or an enhancement layer) are available for a pixel, patch, atlas, or view, a final or resultant pixel value, patch, atlas, or view is generated using the decoded pixel value, patch, atlas, or view for the first description or base layer and the other contributing pixel value, patch, atlas, or view. In scalable coding, the other contributing pixel value is a decoded residual value and the decoded pixel value for the base layer and the residual value are summed to generate the final or resultant pixel value. In multiple description coding, the other contributing pixel value is a decoded second description pixel value and the first description pixel value and the second description pixel value are merged in accordance with the two descriptions by weighted average, simple average, spatial merger, temporal merger, angular merger or the like to generate the final or resultant pixel value, patch, atlas, or view.

As shown in FIG. 14, after a start operation, at operation 1401, a first patch (or other video portion) is selected (or a next patch in subsequent iterations) for processing. Next at operation 1402, a first pixel is selected (or a next pixel in subsequent iterations) within the selected patch (or other video portion). As discussed, such iterative processing may be defined at any video level such as pixel, patch, atlas, frame, view, etc. For the selected pixel or other video portion, processing continues at operation 1403, where a determination is made as to whether the pixel is occupied. If not, processing is bypassed for the pixel and a next pixel is selected at operation 1402. If the pixel is occupied, processing continues at operation 1404, where a determination is made as to whether there are other contributing pixels (e.g., samples) corresponding to the selected pixel. The other contributing pixel or pixels may be scalable coding based or multiple description coding based.

If there are other contributing pixel(s), at operation 1405, a determination is made as to whether a scalable coding mode applies to the selected pixel. If so, processing continues at operation 1406, where the value of the selected pixel is added with one or more other contributing pixels (e.g., from enhancement layers) and the pertinent offsets are subtracted as needed. Such processing generates a final or resultant pixel value for the selected pixel. If a scalable coding mode does not apply (e.g., a multiple description coding mode applies), at operation 1407, the pixel samples are merged in accordance with multiple description video coding techniques. In some embodiments, a weighted average of the selected pixels and one or more other contributing pixels is generated and used as the final result for the pixel value. In some embodiments, the pixels are spatially merged to increase spatial resolution. In some embodiments, the pixels are temporally merged to increase frame rate or temporal resolution Other multiple description coding techniques may be used. Returning to the contributing pixels decision point at operation 1404, if there are not other contributing pixels, the selected pixel sample itself is used as the final result for the pixel.

After the determination of the result for the pixel (e.g., scalable contribution with offset, multiple description contribution with merging, or one pixel value only), processing continues at operation 1408, where a determination is made as to whether the pixel is the last pixel in the patch (or other video portion). If not, processing continues iteratively for all pixels in the patch (or other video portion). If so, processing continues at operation 1409, where a determination is made as to whether the patch (or other video portion) is the last patch (or other video portion) to be processed. If not, processing continues iteratively for all patches (or other video portion) needed for the current display iteration. If so, processing continues at a send to display operation 1410, where the rendered patches (or other video portions) are transmitted for display, to memory for eventual display or other processing, etc.

As shown in the process of FIG. 14, for each pixel (or other video portion) in each patch (or other video portion), if there are additional contributing pixels in other patches that have been processed for that same position in a rendered viewport, the means of combining the contributing pixels depends upon the signaled mode. If multiple description coding is used, a multiple description based merger operation is performed on the contributing pixels, while if scalable coding is used, the decoded pixel for the patch is treated as a base layer and the sample value is added to the sample value of other enhancement layers, with the offset removed, if any.

Figure 15:
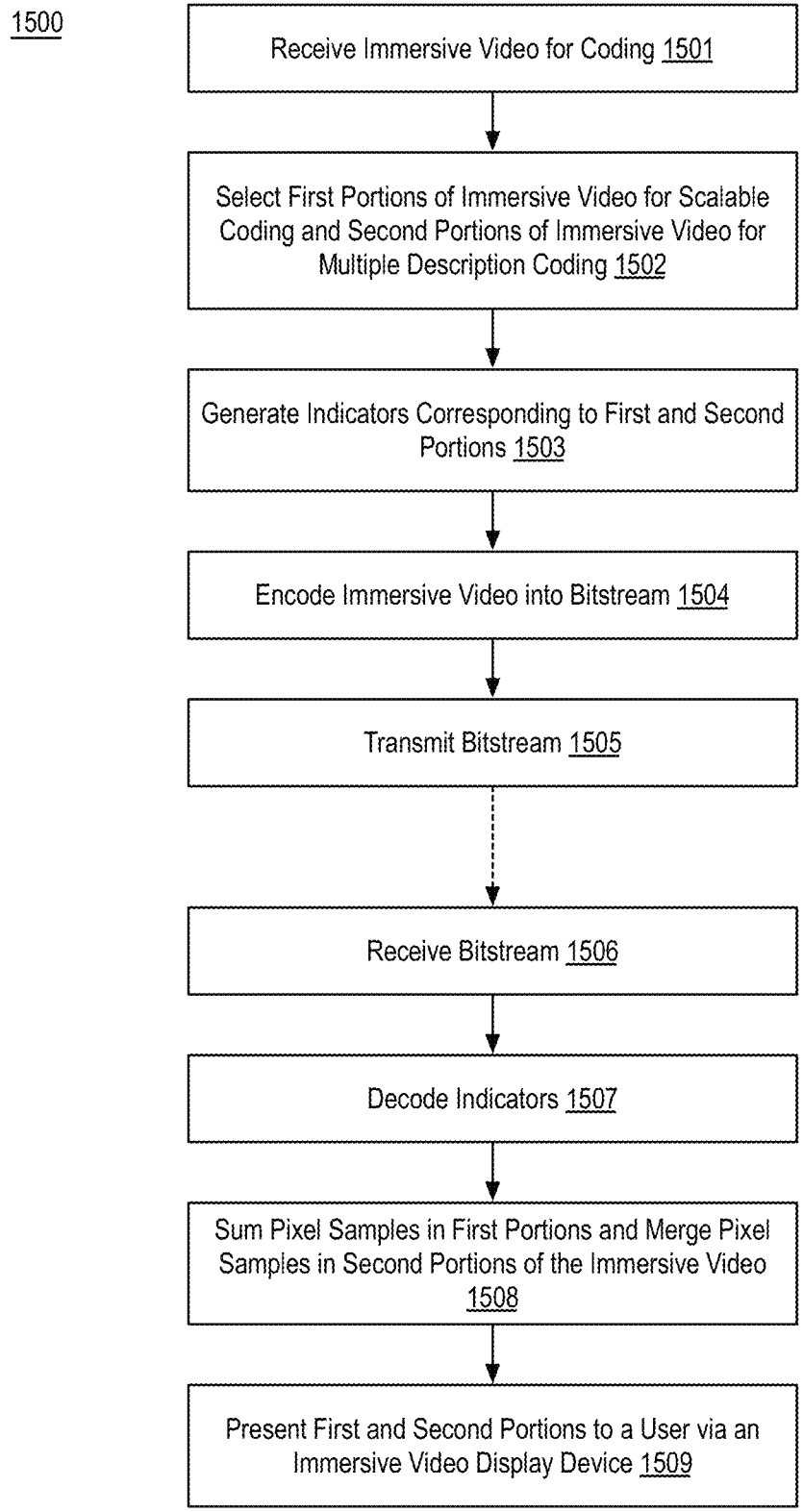
FIG. 15 illustrates an exemplary process for encoding and decoding immersive video using selective scalable coding and multiple description coding.

FIG. 15 illustrates an exemplary process 1500 for encoding and decoding immersive video using selective scalable coding and multiple description coding, arranged in accordance with at least some implementations of the present disclosure. For example, operations 1501-1505 may be performed by an encoder system and operations 1506-1509 may be performed by a decoder/rendering system separate from the encoder system.

Process 1500 begins at operation 1501, where immersive video content is received for coding. The immersive video content may be in any suitable format and may represent any number of views or projections of a scene captured by one or more cameras or of a rendered scene. The immersive video content may be in any suitable resolution.

Processing continues at operation 1502, where first portions of the immersive video content are selected for scalable coding and second portions of the immersive video content are selected for multiple description coding. As discussed, such portions may be any regions, parts, components, or the like of the immersive video content such as patches, atlases, views, projections, or the like. Furthermore, the encoder system may select the format of the video (e.g., selecting multiple representations of the same locations, selecting regions or atlases to be filtered to generate base and enhancement layers, etc.) to be encoded based on the capability of the system to provide selective scalable coding and multiple description coding.

Processing continues at operation 1503, where indicators are generated corresponding to the selected first and second portions. For example, a scalable coding indicator or flag may be provided for each first portion to encoded using scalable coding, a multiple description indicator or flag may be provided for each second portion to encoded using multiple description coding, and either no flag may be provided for portions to be coded using a single value (e.g., a default coding mode that does not need a flag may be used for portions coded without scalable or multiple description coding) or a flag may be provided for portions to be coded using a single value. As used herein, the term scalable or multiple descriptor coding indicator is used to mean an indictor that flags or indicates scalable coding or multiple descriptor coding.

Processing continues at operation 1504, where the immersive video is encoded into an immersive video bitstream with the first portions encoded using scalable coding and the second portions encoded using multiple descriptor coding. The scalable coding includes coding a base layer, generating an enhancement layer, differencing a reconstructed version of the base layer (i.e., the same reconstructed version the decoder can generate) and coding the difference between the enhancement layer and the reconstructed base layer. The encode of the base layer and the difference between the enhancement layer and the reconstructed base layer may be performed using codec based techniques to generate codec (e.g., HEVC) compliant bitstream portions. The multiple description coding includes coding each description. The encode of each description may again be performed using codec based techniques to generate codec (e.g., HEVC) compliant bitstream portions. The bitstream, inclusive of scalable video encoded bitstream portions, multiple descriptor video encoded bitstream portions, single pixel sample video encoded bitstream portions, and flags or indicators indicative of how the portions are encoded, may be stored to memory Processing continues at operation 1505, where the immersive video bitstream is transmitted to a decoder and/or rendering system for decode and eventual display to a user and at operation 1506, where the immersive video bitstream is received by the decoder and/or rendering system. Notably, the encoder system used to perform operations 1501-1505 may be separate from the decoder and/or rendering system used to perform operations 1506-1509. Furthermore, the decoder and/or rendering system may include standards compliant decoder modules and other decode modules or rendering modules to generate immersive video using selective scalable coding and multiple description coding as discussed herein.

Processing continues at operation 1507, where the indicators generated at operation 1503 are decoded. For example, the indicators may be flags in the bitstream such as single bit flags or flags or indicators coded using arithmetic coding. In some embodiments, the indicators include first scalable or multiple descriptor coding indicators corresponding to first portions coded using scalable video coding and second scalable or multiple descriptor coding indicators corresponding to second portions coded using multiple descriptor coding.

Processing continues at operation 1508, where the first portions are decoded using scalable video coding techniques and second portions are decoded using multiple description coding techniques. The scalable video decode is inclusive of decoding a base layer, decoding an enhancement layer, and summing the decoded base layer and decoded enhancement layer. In some embodiments, multiple enhancement layers are employed. The enhancement layer may also be characterized as a residual layer. Notably, the first portions can be decoded and presented with only the base layer, although higher quality is achievable with the enhancement layer(s). In some embodiments, summing the pixel samples of the base layer and pixel samples of the enhancement layer includes removing (e.g., subtracting) an offset applied in the encode of the enhancement layer as discussed herein. The multiple description decode is inclusive of decoding a first description, decoding a second description, and merging pixel samples from the first and second descriptions. In some embodiments, the merging includes applying a weighted or simple average to a first pixel sample from the first description and a second pixel sample from the second description. In some embodiments, the merging includes spatially combining the first pixel sample from the first description and the second pixel sample from the second description. In some embodiments, the merging includes temporally combining the first pixel sample from the first description and the second pixel sample from the second description. Notably, the second portions can be decoded and presented with only one of the descriptions, although higher quality is achievable when both descriptions are available.

Processing continues at operation 1509, where at least parts of the decoded and rendered first and second portions are presented to a user via an immersive video display device. For example, the first and second portions may be used to generate a viewport in the immersive video based on a location and orientation of a view within a scene corresponding to the immersive video. The immersive video display device may be any suitable display such as a head mounted display or the like. The immersive video may be presented in any context such as virtual reality, augmented reality, etc.

Discussion now turns to systems and devices for implementing the discussed techniques, encoders, and decoders. For example, any encoder (encoder system), decoder (decoder system), or bitstream extractor discussed herein may be implemented via the system illustrated in FIG. 18 and/or the device implemented in FIG. 19. Notably, the discussed techniques, encoders, decoders, and bitstream extractors may be implemented via any suitable device or platform discussed herein such as a personal computer, a laptop computer, a tablet, a phablet, a smart phone, a digital camera, a gaming console, a wearable device, a display device, an all-in-one device, a two-in-one device, or the like.

Figure 16:
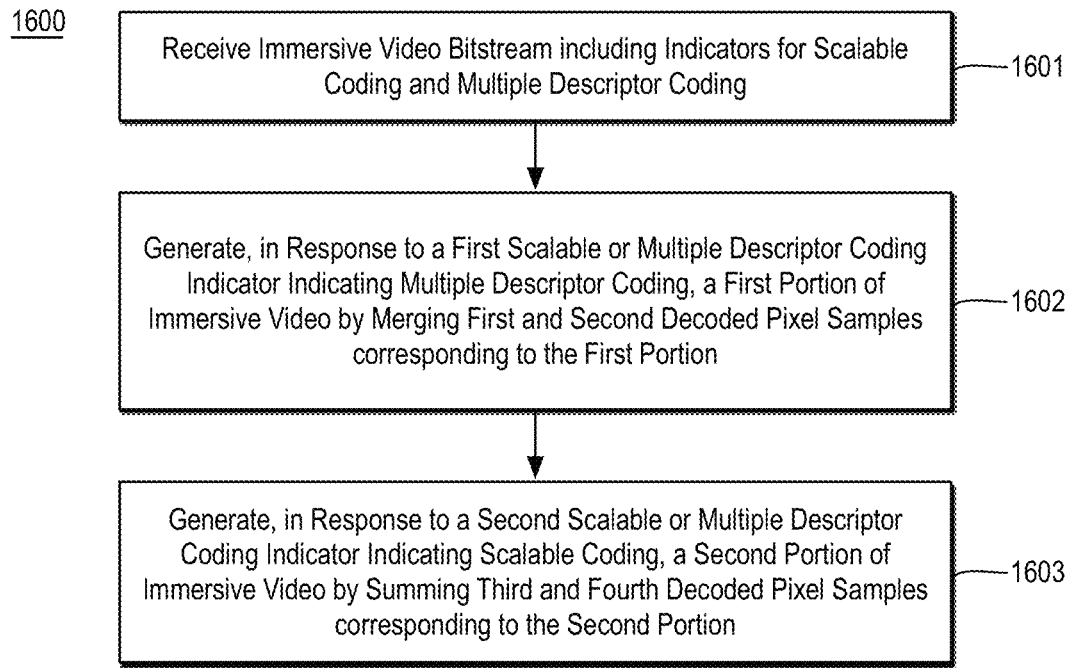
FIG. 16 is a flow diagram illustrating an example process for decoding and/or rendering immersive video.

FIG. 16 is a flow diagram illustrating an example process 1600 for decoding and/or rendering immersive video, arranged in accordance with at least some implementations of the present disclosure. Process 1600 may include one or more operations 1601-1603 as illustrated in FIG. 16. Process 1600 may form at least part of an immersive video decoding, immersive video rendering, or virtual view generation process, or the like in the context of immersive video inclusive of 360 video, virtual reality, augmented reality, or the like. Furthermore, process 1600 will be described herein with reference to system 1700 of FIG. 17.

Figure 17:
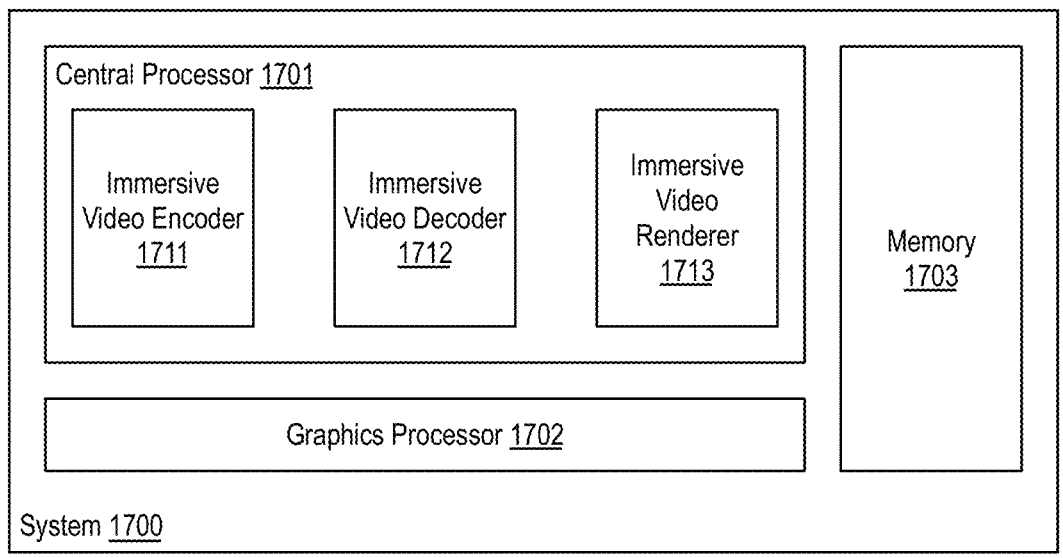
FIG. 17 is an illustrative diagram of an example system for decoding and/or rendering immersive video.

FIG. 17 is an illustrative diagram of an example system 1700 for decoding and/or rendering immersive video, arranged in accordance with at least some implementations of the present disclosure. As shown in FIG. 17, system 1700 may include a central processor 1701, a graphics processor 1702, and a memory 1703. Also as shown, central processor 1701 may implement one or more of an immersive video encoder 1711, an immersive video decoder 1712, and an immersive video renderer 1713. In the example of system 1700, memory 1703 may store bitstream data, video portion data, patch data, sequence data, atlas data, indicators or flags, or any other data discussed herein.

As shown, in some examples, one or more or portions of immersive video encoder 1711, immersive video decoder 1712, and immersive video renderer 1713 are implemented via central processor 1701. In other examples, one or more or portions of immersive video encoder 1711, immersive video decoder 1712, and immersive video renderer 1713 are implemented via graphics processor 1702, a video processing unit, a vide processing pipeline, a video or image signal processor, or the like. In some examples, one or more or portions of immersive video encoder 1711, immersive video decoder 1712, and immersive video renderer 1713 are implemented in hardware as a system-on-a-chip (SoC). In some examples, one or more or portions of immersive video encoder 1711, immersive video decoder 1712, and immersive video renderer 1713 are implemented in hardware via a FPGA.

Graphics processor 1702 may include any number and type of image or graphics processing units that may provide the operations as discussed herein. Such operations may be implemented via software or hardware or a combination thereof. For example, graphics processor 1702 may include circuitry dedicated to manipulate and/or analyze images obtained from memory 1703. Central processor 1701 may include any number and type of processing units or modules that may provide control and other high level functions for system 1700 and/or provide any operations as discussed herein. Memory 1703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1703 may be implemented by cache memory. In an embodiment, one or more or portions of immersive video encoder 1711, immersive video decoder 1712, and immersive video renderer 1713 are implemented via an execution unit (EU) of graphics processor 1702. The EU may include, for example, programmable logic or circuitry such as a logic core or cores that may provide a wide array of programmable logic functions. In an embodiment, one or more or portions of immersive video encoder 1711, immersive video decoder 1712, and immersive video renderer 1713 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 16, process 1600 begins at operation 1601, where an immersive video bitstream including a first scalable or multiple descriptor coding indicator corresponding to a first portion of immersive video and a second scalable or multiple descriptor coding indicator corresponding to a second portion of the immersive video is received. The received immersive video bitstream may be in any suitable format such as a standards compliant. The bitstream includes any number of indicators indicating portions of the bitstream are coded using multiple descriptor coding and any number of indicators indicating portions of the bitstream are coded using scalable video coding. In some embodiments, the first and second portions are one of a patch of immersive video, an immersive video atlas, or an immersive video view. In some embodiments, the first scalable or multiple descriptor coding indicator includes an indicator for one of a video sequence, a picture, an access unit, an atlas, or a patch. In some embodiments, the first scalable or multiple descriptor coding indicator includes a flag coded as a single bit or coded using CABAC arithmetic coding.

Processing continues at operation 1602, where, in response to the first scalable or multiple descriptor coding indicator indicating multiple descriptor coding, the first portion of the immersive video is generated by merging first and second decoded pixel samples corresponding to the first portion. The first and second decoded pixel samples may be merged by averaging, spatial merger, temporal merger, or the like. For example, the first decoded pixel sample may be from a first description and the second decoded pixel sample may be from a second description. In some embodiments, averaging the first and second decoded pixel samples includes a weighted averaging of the first and second decoded pixel samples. In some embodiments, averaging the first and second decoded pixel samples includes a simple averaging of the first and second decoded pixel samples. In some embodiments, the first and second pixel samples are odd and even samples, respectively, of the first portion of the immersive video, the first portion of the immersive video comprising a single view of a scene generated by merging the odd and even samples.

Processing continues at operation 1603, where, in response to the second scalable or multiple descriptor coding indicator indicating scalable coding, the second portion of the immersive video is generated by summing third and fourth decoded pixel samples corresponding to the second portion. For example, the third decoded pixel sample may be from a base layer and the fourth decoded pixel sample may be a residual value from an enhancement layer. In some embodiments, wherein the third pixel sample corresponds to a low frequency layer and the fourth pixel sample corresponds to a high frequency layer of the first portion of the immersive video. In some embodiments, the third pixel sample corresponds to a near layer of the of the first portion of the immersive video and the fourth pixel sample corresponds to a far layer of the of the first portion of the immersive video.

In some embodiments, process 1600 further includes generating a third portion of the immersive video, in response to no third scalable or multiple descriptor coding indicator corresponding to the third portion or the third scalable or multiple descriptor coding indicator indicating no scalable nor multiple descriptor coding, based only on single pixel samples for each pixel of the third portion. For example, some portions of the immersive video may be decoded and/or rendered with only a single pixel sample for each pixel of the portion. In some embodiments, process 1600 further includes presenting at least part of the first portion and at least part of the second video portions to a user via an immersive video display device.

Process 1600 may be repeated any number of times either in series or in parallel for any number of portions of immersive video, time instances, etc. Process 1600 may be implemented by any suitable device(s), system(s), apparatus(es), or platform(s) such as those discussed herein. In an embodiment, process 1600 is implemented by a system or apparatus having a memory to store an immersive video bitstream, as well as any other data structures discussed herein, and a processor to perform any of operations 1601-1603. In an embodiment, the memory and the processor are implemented via a monolithic field programmable gate array integrated circuit. As used herein, the term monolithic indicates a device that is discrete from other devices, although it may be coupled to other devices for communication and power supply.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the devices or systems, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 18:
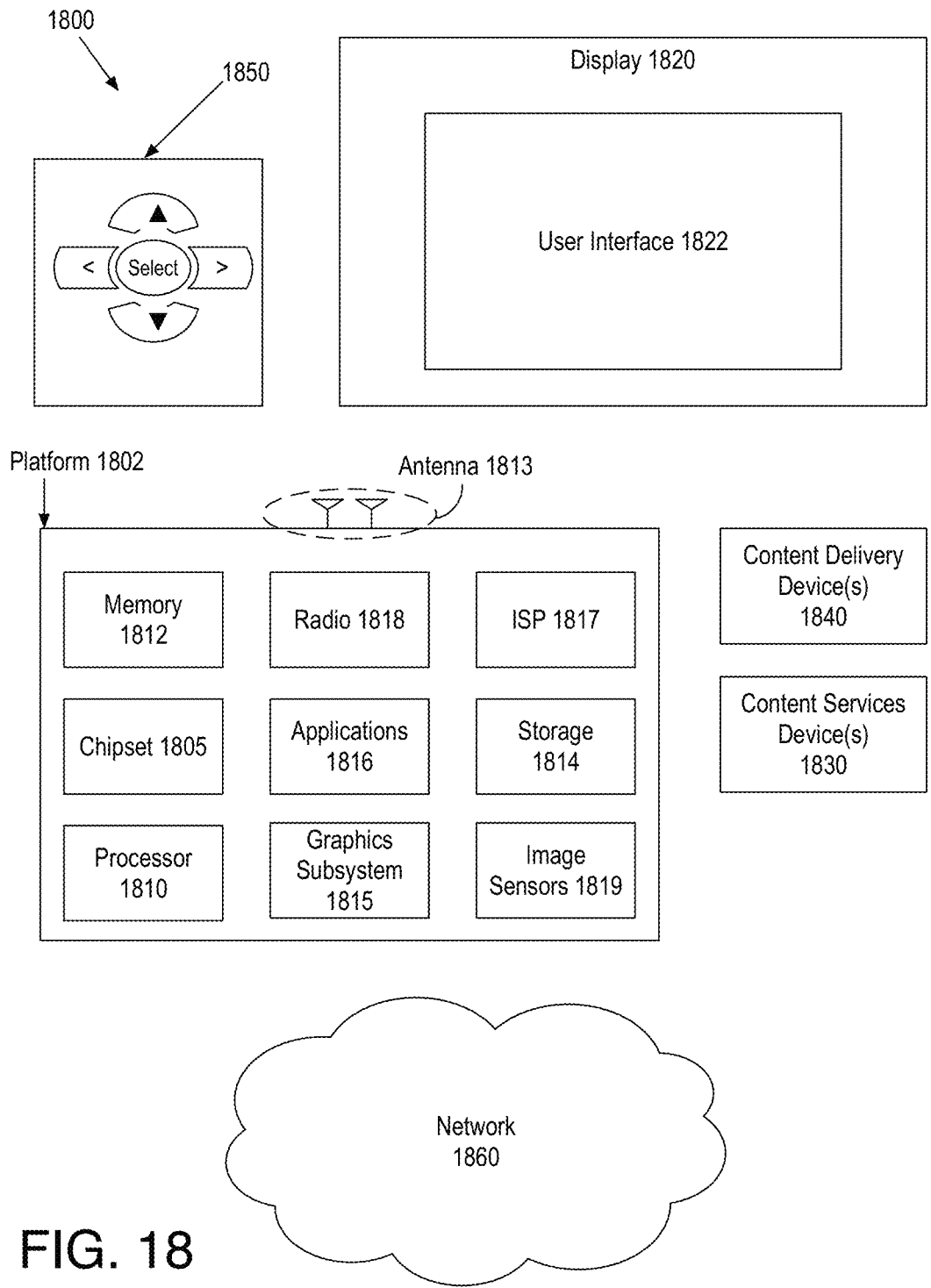
FIG. 18 is an illustrative diagram of an example system.

FIG. 18 is an illustrative diagram of an example system 1800, arranged in accordance with at least some implementations of the present disclosure. In various implementations, system 1800 may be a mobile device system although system 1800 is not limited to this context. For example, system 1800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth.

In various implementations, system 1800 includes a platform 1802 coupled to a display 1820. Platform 1802 may receive content from a content device such as content services device(s) 1830 or content delivery device(s) 1840 or other content sources such as image sensors 1819. For example, platform 1802 may receive image data as discussed herein from image sensors 1819 or any other content source. A navigation controller 1850 including one or more navigation features may be used to interact with, for example, platform 1802 and/or display 1820. Each of these components is described in greater detail below.

In various implementations, platform 1802 may include any combination of a chipset 1805, processor 1810, memory 1812, antenna 1813, storage 1814, graphics subsystem 1815, applications 1816, image signal processor 1817 and/or radio 1818. Chipset 1805 may provide intercommunication among processor 1810, memory 1812, storage 1814, graphics subsystem 1815, applications 1816, image signal processor 1817 and/or radio 1818. For example, chipset 1805 may include a storage adapter (not depicted) capable of providing intercommunication with storage 1814.

Processor 1810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1810 may be dual-core processor(s), dual-core mobile processor(s), and so forth.

Memory 1812 may be implemented as a volatile memory device such as, but not limited to, a Random Access Memory (RAM), Dynamic Random Access Memory (DRAM), or Static RAM (SRAM).

Storage 1814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1814 may include technology to increase the storage performance enhanced protection for valuable digital media when multiple hard drives are included, for example.

Image signal processor 1817 may be implemented as a specialized digital signal processor or the like used for image processing. In some examples, image signal processor 1817 may be implemented based on a single instruction multiple data or multiple instruction multiple data architecture or the like. In some examples, image signal processor 1817 may be characterized as a media processor. As discussed herein, image signal processor 1817 may be implemented based on a system on a chip architecture and/or based on a multi-core architecture.

Graphics subsystem 1815 may perform processing of images such as still or video for display. Graphics subsystem 1815 may be a graphics processing unit (GPU) or a visual processing unit (VPU), for example. An analog or digital interface may be used to communicatively couple graphics subsystem 1815 and display 1820. For example, the interface may be any of a High-Definition Multimedia Interface, DisplayPort, wireless HDMI, and/or wireless HD compliant techniques. Graphics subsystem 1815 may be integrated into processor 1810 or chipset 1805. In some implementations, graphics subsystem 1815 may be a stand-alone device communicatively coupled to chipset 1805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1818 may operate in accordance with one or more applicable standards in any version.

In various implementations, display 1820 may include any television type monitor or display. Display 1820 may include, for example, a computer display screen, touch screen display, video monitor, television-like device, and/or a television. Display 1820 may be digital and/or analog. In various implementations, display 1820 may be a holographic display. Also, display 1820 may be a transparent surface that may receive a visual projection. Such projections may convey various forms of information, images, and/or objects. For example, such projections may be a visual overlay for a mobile augmented reality (MAR) application. Under the control of one or more software applications 1816, platform 1802 may display user interface 1822 on display 1820.

In various implementations, content services device(s) 1830 may be hosted by any national, international and/or independent service and thus accessible to platform 1802 via the Internet, for example. Content services device(s) 1830 may be coupled to platform 1802 and/or to display 1820. Platform 1802 and/or content services device(s) 1830 may be coupled to a network 1860 to communicate (e.g., send and/or receive) media information to and from network 1860. Content delivery device(s) 1840 also may be coupled to platform 1802 and/or to display 1820.

Image sensors 1819 may include any suitable image sensors that may provide image data based on a scene. For example, image sensors 1819 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1819 may include any device that may detect information of a scene to generate image data.

In various implementations, content services device(s) 1830 may include a cable television box, personal computer, network, telephone, Internet enabled devices or appliance capable of delivering digital information and/or content, and any other similar device capable of uni-directionally or bi-directionally communicating content between content providers and platform 1802 and/or display 1820, via network 1860 or directly. It will be appreciated that the content may be communicated uni-directionally and/or bi-directionally to and from any one of the components in system 1800 and a content provider via network 1860. Examples of content may include any media information including, for example, video, music, medical and gaming information, and so forth.

Content services device(s) 1830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1802 may receive control signals from navigation controller 1850 having one or more navigation features. The navigation features of navigation controller 1850 may be used to interact with user interface 1822, for example. In various embodiments, navigation controller 1850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1850 may be replicated on a display (e.g., display 1820) by movements of a pointer, cursor, focus ring, or other visual indicators displayed on the display. For example, under the control of software applications 1816, the navigation features located on navigation controller 1850 may be mapped to virtual navigation features displayed on user interface 1822, for example. In various embodiments, navigation controller 1850 may not be a separate component but may be integrated into platform 1802 and/or display 1820. The present disclosure, however, is not limited to the elements or in the context shown or described herein.

In various implementations, drivers (not shown) may include technology to enable users to instantly turn on and off platform 1802 like a television with the touch of a button after initial boot-up, when enabled, for example. Program logic may allow platform 1802 to stream content to media adaptors or other content services device(s) 1830 or content delivery device(s) 1840 even when the platform is turned "off." In addition, chipset 1805 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1800 may be integrated. For example, platform 1802 and content services device(s) 1830 may be integrated, or platform 1802 and content delivery device(s) 1840 may be integrated, or platform 1802, content services device(s) 1830, and content delivery device(s) 1840 may be integrated, for example. In various embodiments, platform 1802 and display 1820 may be an integrated unit. Display 1820 and content service device(s) 1830 may be integrated, or display 1820 and content delivery device(s) 1840 may be integrated, for example. These examples are not meant to limit the present disclosure.

In various embodiments, system 1800 may be implemented as a wireless system, a wired system, or a combination of both. When implemented as a wireless system, system 1800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 18.

Figure 19:
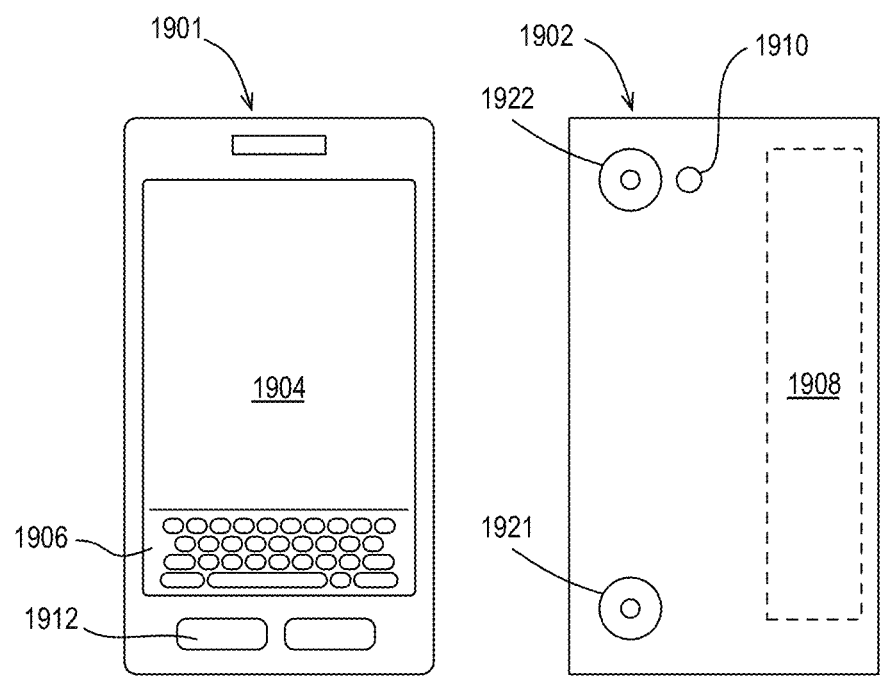
FIG. 19 illustrates an example small form factor device, all arranged in accordance with at least some implementations of the present disclosure.

As described above, system 1800 may be embodied in varying physical styles or form factors. FIG. 19 illustrates an example small form factor device 1900, arranged in accordance with at least some implementations of the present disclosure. In some examples, system 1800 may be implemented via device 1900. In other examples, other systems, components, or modules discussed herein or portions thereof may be implemented via device 1900. In various embodiments, for example, device 1900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 19, device 1900 may include a housing with a front 1901 and a back 1902. Device 1900 includes a display 1904, an input/output (I/O) device 1906, a color camera 1921, a color camera 1922, and an integrated antenna 1908. In some embodiments, color camera 1921 and color camera 1922 attain planar images as discussed herein. In some embodiments, device 1900 does not include color camera 1921 and 1922 and device 1900 attains input image data (e.g., any input image data discussed herein) from another device. Device 1900 also may include navigation features 1912. I/O device 1906 may include any suitable I/O device for entering information into a mobile computing device. Examples for I/O device 1906 may include an alphanumeric keyboard, a numeric keypad, a touch pad, input keys, buttons, switches, microphones, speakers, voice recognition device and software, and so forth. Information also may be entered into device 1900 by way of microphone (not shown), or may be digitized by a voice recognition device. As shown, device 1900 may include color cameras 1921, 1922, and a flash 1910 integrated into back 1902 (or elsewhere) of device 1900. In other examples, color cameras 1921, 1922, and flash 1910 may be integrated into front 1901 of device 1900 or both front and back sets of cameras may be provided. Color cameras 1921, 1922 and a flash 1910 may be components of a camera module to originate color image data with IR texture correction that may be processed into an image or streaming video that is output to display 1904 and/or communicated remotely from device 1900 via antenna 1908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following pertain to further embodiments.

In one or more first embodiments, a method comprises receiving an immersive video bitstream comprising a plurality of pixel values each associated with an immersive video view, the bitstream comprising a first scalable or multiple descriptor coding indicator corresponding to a first portion of immersive video and a second scalable or multiple descriptor coding indicator corresponding to a second portion of the immersive video, generating, in response to the first scalable or multiple descriptor coding indicator indicating multiple descriptor coding, the first portion of the immersive video by merging first and second decoded pixel samples corresponding to the first portion, and generating, in response to the second scalable or multiple descriptor coding indicator indicating scalable coding, the second portion of the immersive video by summing third and fourth decoded pixel samples corresponding to the second portion.

In one or more second embodiments, further to the first embodiment, generating the second portion of the immersive video comprises summing the third and fourth decoded pixel samples and removing an offset.

In one or more third embodiments, further to the first or second embodiments, the first scalable or multiple descriptor coding indicator comprises an indicator for one of a video sequence, a picture, an access unit, an atlas, or a patch.

In one or more fourth embodiments, further to any of the first through third embodiments, the first scalable or multiple descriptor coding indicator comprises a flag coded as a single bit or coded using arithmetic coding.

In one or more fifth embodiments, further to any of the first through fourth embodiments, the third pixel sample corresponds to a low frequency layer and the fourth pixel sample corresponds to a high frequency layer of the first portion of the immersive video.

In one or more sixth embodiments, further to any of the first through fifth embodiments, the first and second portions comprise one of a patch of immersive video, an immersive video atlas, or an immersive video view.

In one or more seventh embodiments, further to any of the first through sixth embodiments, the first portion of the immersive video is generated by one of weighted averaging the first and second decoded pixel samples, simple averaging of the first and second decoded pixel samples, spatially merging the first and second decoded pixel samples, or temporally merging the first and second decoded pixel samples.

In one or more eighth embodiments, further to any of the first through seventh embodiments, the third decoded pixel sample comprises a pixel value and the fourth decoded pixel sample comprises a residual value.

In one or more ninth embodiments, further to any of the first through eighth embodiments, the third pixel sample corresponds to a near layer of the of the first portion of the immersive video and the fourth pixel sample corresponds to a far layer of the of the first portion of the immersive video.

In one or more tenth embodiments, further to any of the first through ninth embodiments, the method further comprises generating a third portion of the immersive video based only on single pixel samples for each pixel of the third portion.

In one or more eleventh embodiments, further to any of the first through tenth embodiments, the method further comprises presenting at least part of the first portion and at least part of the second video portions to a user via an immersive video display device.

In one or more twelfth embodiments, a device or system includes a memory and one or more processors to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A decoder system comprising:
   a memory to store at least a portion of an immersive video of a bitstream comprising a plurality of pixel values each associated with an immersive video view, the bitstream comprising a first indicator indicating a switch between scalable coding and multiple descriptor coding to be used in a first portion of the immersive video and a second indicator indicating a switch between scalable coding and multiple descriptor coding to be used in a second portion of the immersive video; and
   processor circuitry coupled to the memory, the processor circuitry to:
      generate, in response to the first indicator indicating multiple descriptor coding, the first portion of the immersive video by merging first and second decoded pixel samples in the first portion; and
      generate, in response to the second indicator indicating scalable coding, the second portion of the immersive video by summing third and fourth decoded pixel samples in the second portion.

2. The system of claim 1, wherein the processor circuitry to generate the second portion of the immersive video comprises the processor circuitry to sum the third and fourth decoded pixel samples and remove an offset.

3. The system of claim 1, wherein the first indicator comprises an indicator for one of a video sequence, a picture, an access unit, an atlas, or a patch.

4. The system of claim 1, wherein the first indicator comprises a flag coded as a single bit or coded using arithmetic coding.

5. The system of claim 1, wherein the third pixel sample corresponds to a low frequency layer and the fourth pixel sample corresponds to a high frequency layer of the first portion of the immersive video.

6. The system of claim 1, wherein the first and second portions comprise one of a patch of immersive video, an immersive video atlas, or an immersive video view.

7. The system of claim 1, wherein the first portion of the immersive video is generated by one of weighted averaging the first and second decoded pixel samples, simple averaging of the first and second decoded pixel samples, spatially merging the first and second decoded pixel samples, or temporally merging the first and second decoded pixel samples.

8. The system of claim 1, wherein the third decoded pixel sample comprises a pixel value and the fourth decoded pixel sample comprises a residual value.

9. The system of claim 1, wherein the third pixel sample corresponds to a near layer of the of the first portion of the immersive video and the fourth pixel sample corresponds to a far layer of the of the first portion of the immersive video.

10. The system of claim 1, the processor circuitry to:
generate a third portion of the immersive video based only on single pixel samples for each pixel of the third portion.

11. The system of claim 1, the processor circuitry to:
present at least part of the first portion and at least part of the second video portions to a user via an immersive video display device.

12. A method comprising:
receiving an immersive video of a bitstream comprising a plurality of pixel values each associated with an immersive video view, the bitstream comprising a first coding indicator indicating a switch between scalable coding and multiple descriptor coding to be used in a first portion of the immersive video and a second indicator indicating a switch between scalable coding and multiple descriptor coding to be used in a second portion of the immersive video;
generating, in response to the first indicator indicating multiple descriptor coding, the first portion of the immersive video by merging first and second decoded pixel samples corresponding to the first portion; and
generating, in response to the second indicator indicating scalable coding, the second portion of the immersive video by summing third and fourth decoded pixel samples corresponding to the second portion.

13. The method of claim 12, wherein generating the second portion of the immersive video comprises summing the third and fourth decoded pixel samples and removing an offset.

14. The method of claim 12, wherein the first indicator comprises an indicator for one of a video sequence, a picture, an access unit, an atlas, or a patch.

15. The method of claim 12, wherein the first indicator comprises a flag coded as a single bit or coded using arithmetic coding.

16. The method of claim 12, wherein the third pixel sample corresponds to a low frequency layer and the fourth pixel sample corresponds to a high frequency layer of the first portion of the immersive video.

17. At least one non-transitory machine readable medium comprising a plurality of instructions that, in response to being executed on a computing device, cause the computing device to generate immersive video by:
receiving an immersive video of a bitstream comprising a plurality of pixel values each associated with an immersive video view, the bitstream comprising a first indicator indicating a switch between scalable coding and multiple description coding to be used in a first portion of the immersive video and a second indicator indicating a switch between scalable coding and multiple description coding to be used in a second portion of the immersive video;
generating, in response to the first scalable or multiple descriptor coding indicator indicating multiple descriptor coding, the first portion of the immersive video by merging first and second decoded pixel samples corresponding to the first portion; and
generating, in response to the second scalable or multiple descriptor coding indicator indicating scalable coding, the second portion of the immersive video by summing third and fourth decoded pixel samples corresponding to the second portion.

18. The machine readable medium of claim 17, wherein generating the second portion of the immersive video comprises summing the third and fourth decoded pixel samples and removing an offset.

19. The machine readable medium of claim 17, wherein the first indicator comprises an indicator for one of a video sequence, a picture, an access unit, an atlas, or a patch.

20. The machine readable medium of claim 17, wherein the first indicator comprises a flag coded as a single bit or coded using arithmetic coding.

* * * * *